(12) United States Patent
Brock et al.

(10) Patent No.: US 11,145,005 B2
(45) Date of Patent: Oct. 12, 2021

(54) SYSTEM AND METHOD FOR GENERATING DYNAMIC REPAYMENT TERMS

(71) Applicant: Square, Inc., San Francisco, CA (US)

(72) Inventors: Christopher Michael Brock, Berkeley, CA (US); Emily Chiu, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 16/825,697

(22) Filed: Mar. 20, 2020

(65) Prior Publication Data

US 2021/0133869 A1 May 6, 2021

Related U.S. Application Data

(60) Provisional application No. 62/929,104, filed on Nov. 1, 2019.

(51) Int. Cl.
| | |
|---|---|
| *G06Q 40/00* | (2012.01) |
| *G06Q 20/40* | (2012.01) |
| *G06N 20/00* | (2019.01) |
| *G06Q 20/10* | (2012.01) |

(Continued)

(52) U.S. Cl.
CPC .......... *G06Q 40/125* (2013.12); *G06N 20/00* (2019.01); *G06Q 20/102* (2013.01); *G06Q 20/108* (2013.01); *G06Q 20/223* (2013.01); *G06Q 20/409* (2013.01); *G06Q 40/025* (2013.01)

(58) Field of Classification Search
CPC .................................................. G06Q 40/025
See application file for complete search history.

(56) References Cited

U.S. PATENT DOCUMENTS

| | | |
|---|---|---|
| 9,824,394 B1 | 11/2017 | Boates et al. |
| 10,373,185 B1 | 8/2019 | Spitzer |
| 10,387,881 B2 | 8/2019 | Studnitzer |

(Continued)

FOREIGN PATENT DOCUMENTS

| | | |
|---|---|---|
| CN | 109 242 672 A | 1/2019 |
| KR | 20100088047 A | 8/2010 |
| WO | 2021/086814 A1 | 5/2021 |

OTHER PUBLICATIONS

Non-Final Office Action dated Mar. 27, 2020, for U.S. Appl. No. 16/745,267, of Reses, J., filed on Jan. 16, 2020.

(Continued)

*Primary Examiner* — Edward Chang
(74) *Attorney, Agent, or Firm* — Mattingly & Malur, PC

(57) ABSTRACT

In one embodiment, a method includes receiving, by a payment service system (PSS) from a first device associated with a first user, a request to borrow an amount from a second user. The first user is associated with a first user account and the second user is associated with a second user account, both of which are maintained by the PSS. The method includes in response to receiving the request, identifying, by the PSS, a first transaction history associated with the first user account and a second transaction history associated with the second user account in a data store of the PSS. The method includes determining, by the PSS, repayment terms to be associated with the request to borrow the amount based on the first transaction history and the second transaction history.

20 Claims, 20 Drawing Sheets

(51) Int. Cl.
*G06Q 40/02* (2012.01)
*G06Q 20/22* (2012.01)

(56) References Cited

U.S. PATENT DOCUMENTS

| | | |
|---|---|---|
| 2002/0042742 A1 | 4/2002 | Glover et al. |
| 2003/0208432 A1 | 11/2003 | Wallman |
| 2004/0010458 A1 | 1/2004 | Friedman |
| 2004/0111359 A1 | 6/2004 | Hudock |
| 2009/0112659 A1 | 4/2009 | Mullen et al. |
| 2009/0198632 A1 | 8/2009 | Dillahunty |
| 2009/0222379 A1 | 9/2009 | Choudhuri et al. |
| 2009/0240586 A1 | 9/2009 | Ramer et al. |
| 2010/0280976 A1 | 11/2010 | Carpenter et al. |
| 2011/0145139 A1 | 6/2011 | Valdes et al. |
| 2011/0264581 A1 | 10/2011 | Clyne |
| 2011/0270779 A1 | 11/2011 | Showalter |
| 2012/0030100 A1* | 2/2012 | Bulawa ............... G06Q 20/102 705/40 |
| 2012/0047054 A1 | 2/2012 | Vasinkevich |
| 2012/0109749 A1 | 5/2012 | Subramanian et al. |
| 2012/0221420 A1 | 8/2012 | Ross |
| 2013/0006845 A1* | 1/2013 | Kremen ............... G06Q 40/025 705/38 |
| 2013/0218657 A1 | 8/2013 | Salmon et al. |
| 2014/0164164 A1 | 6/2014 | Rabenold et al. |
| 2015/0073929 A1 | 3/2015 | Psota et al. |
| 2015/0206164 A1 | 7/2015 | Espana et al. |
| 2016/0253656 A1 | 9/2016 | Dragushan et al. |
| 2016/0371780 A1 | 12/2016 | Barratt et al. |
| 2017/0109823 A1 | 4/2017 | Crosthwaite et al. |
| 2018/0018610 A1 | 1/2018 | Del Balso et al. |
| 2018/0150910 A1 | 5/2018 | Grech et al. |
| 2018/0349986 A1* | 12/2018 | Fidanza ............... G06Q 40/025 |
| 2021/0133868 A1 | 5/2021 | Brock et al. |
| 2021/0133894 A1 | 5/2021 | Reses |

OTHER PUBLICATIONS

Final Office Action dated Jan. 6, 2021, for U.S. Appl. No. 16/457,877 of Stipech, K. D. et al., filed Jun. 28, 2019.
Non-Final Office Action dated Dec. 30, 2019, for U.S. Appl. No. 16/457,877, of Stipech K.D., et al., filed Jun. 28, 2019.
Final Office Action dated Mar. 6, 2020, for U.S. Appl. No. 16/457,877, of Stipech K.D., et al., filed Jun. 28, 2019.
Advisory Action dated Apr. 28, 2020, for U.S. Appl. No. 16/457,877, of Stipech K.D., et al., filed Jun. 28, 2019.
Non-Final Office Action dated Jul. 14, 2020, for U.S. Appl. No. 16/457,877 of Stipech, K. D. et al., filed Jun. 28, 2019.
Final Office Action dated Aug. 10, 2020, for U.S. Appl. No. 16/745,267, of Reses, J., filed on Jan. 16, 2020.
Non-Final Office Action dated Aug. 19, 2020, for U.S. Appl. No. 16/745,263, of Brock, C. M., et al., filed on Jan. 16, 2020.
Final Office Action dated Mar. 19, 2021, for U.S. Appl. No. 16/745,263, of Brock, C. M., et al., filed on Jan. 16, 2020.
Non-Final Office Action dated Apr. 15, 2021, for U.S. Appl. No. 16/745,267, of Reses, J., filed on Jan. 16, 2020.
International Search Report and Written Opinion for International Application No. PCT/US2020/057459, dated Jan. 13, 2021.

* cited by examiner

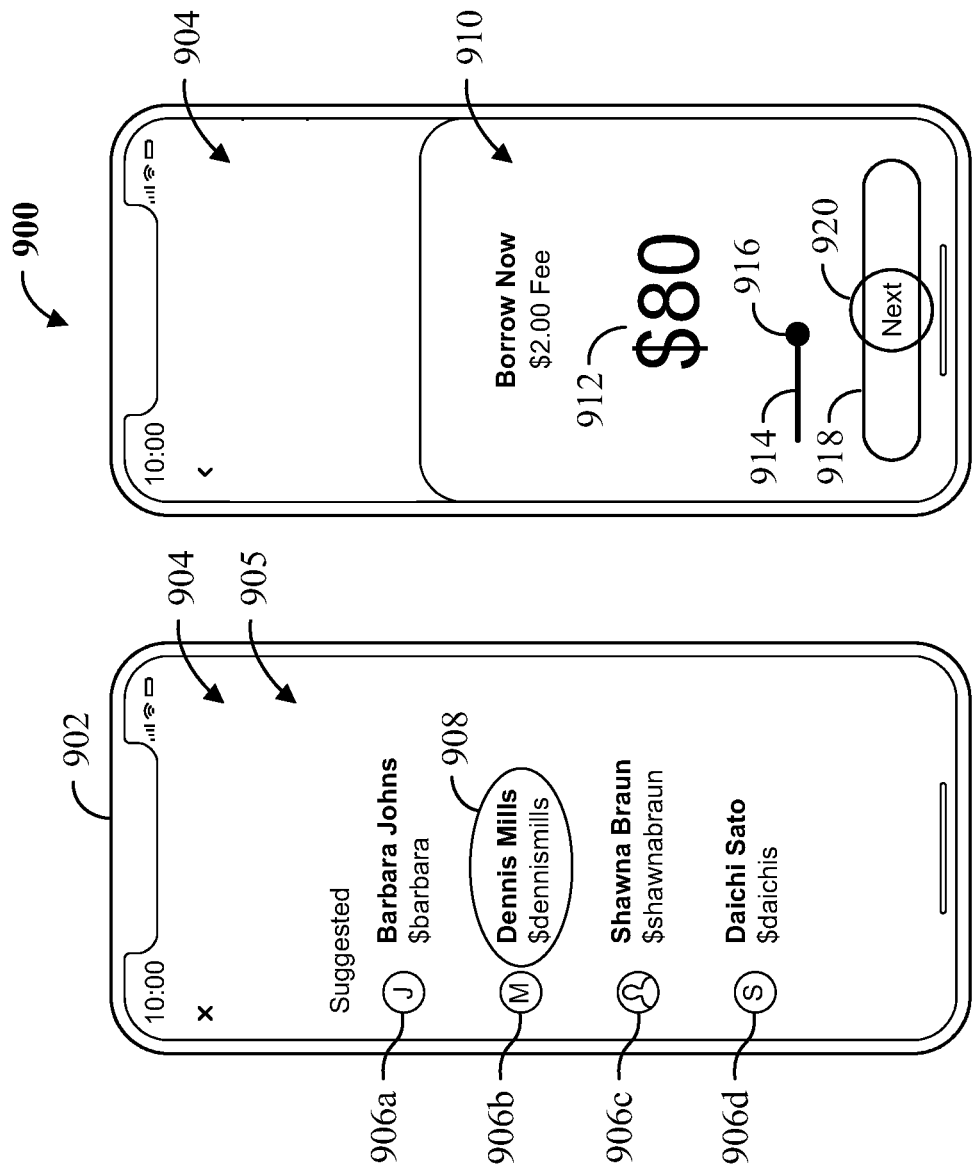

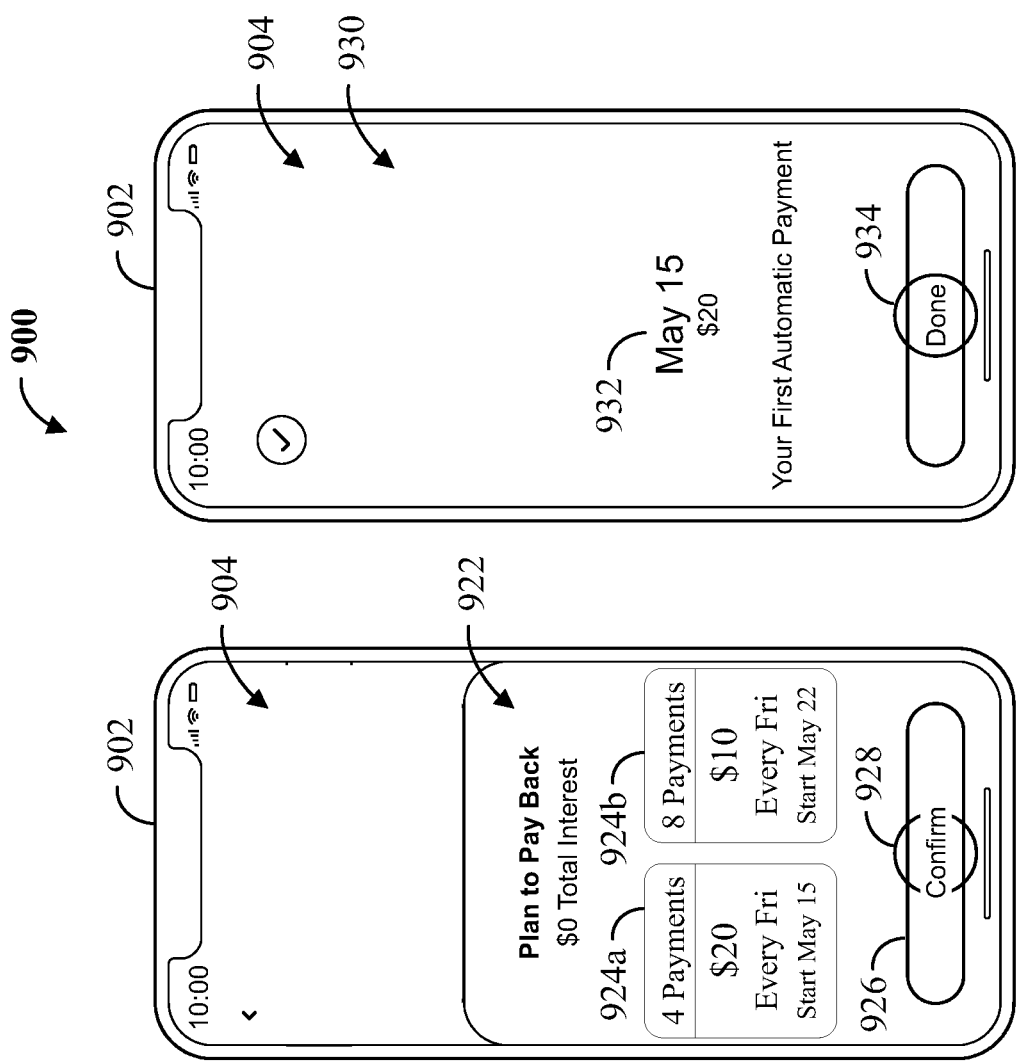

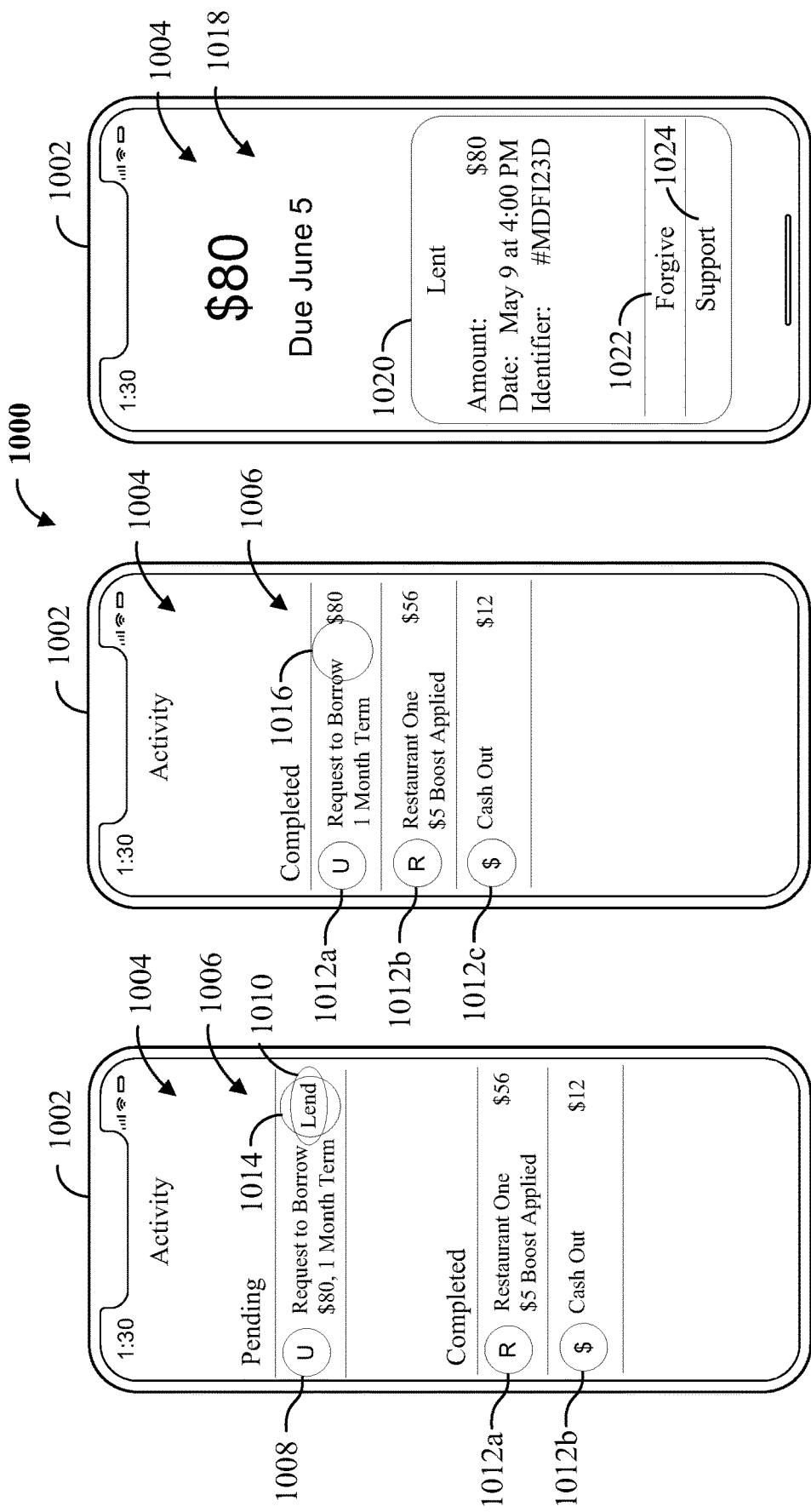

SYSTEM AND METHOD FOR GENERATING DYNAMIC REPAYMENT TERMS

PRIORITY

This application claims the benefit under 35 U.S.C. § 119(e) of U.S. Provisional Patent Application No. 62/929,104, filed 1 Nov. 2019, which is incorporated herein by reference.

BACKGROUND

A line of credit is a credit facility extended by a bank or other financial institution to a government, business, or individual customer that enables the customer to draw on the facility when the customer needs funds. A line of credit takes several forms, such as an overdraft limit, demand loan, special purpose, export packing credit, term loan, discounting, purchase of commercial bills, etc. It is effectively a source of funds that can readily be tapped at the borrower's discretion. Interest is paid only on money actually withdrawn. Lines of credit can be secured by collateral or may be unsecured.

A credit card is a payment card issued to users (cardholders) to enable the cardholder to pay a merchant for goods and services based on the cardholder's promise to the card issuer to pay them for the amounts plus the other agreed charges. The card issuer (usually a bank) creates a revolving account and grants a line of credit to the cardholder, from which the cardholder can borrow money for payment to a merchant or as a cash advance. A credit card allows the consumers to build a continuing balance of debt, subject to interest being charged.

An installment loan is a loan that is repaid over time with a set number of scheduled payments; normally at least two payments are made towards the loan. The term of loan may be as little as a few months and as long as 30 years. For example, a mortgage is a type of installment loan.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIGS. 9A-9F illustrate example user interfaces associated with accessing a debt instrument according to one embodiment.

FIGS. 10A-10C illustrate example user interfaces associated with accessing a debt instrument according to one embodiment.

DESCRIPTION OF EXAMPLE EMBODIMENTS

Figure 1A:
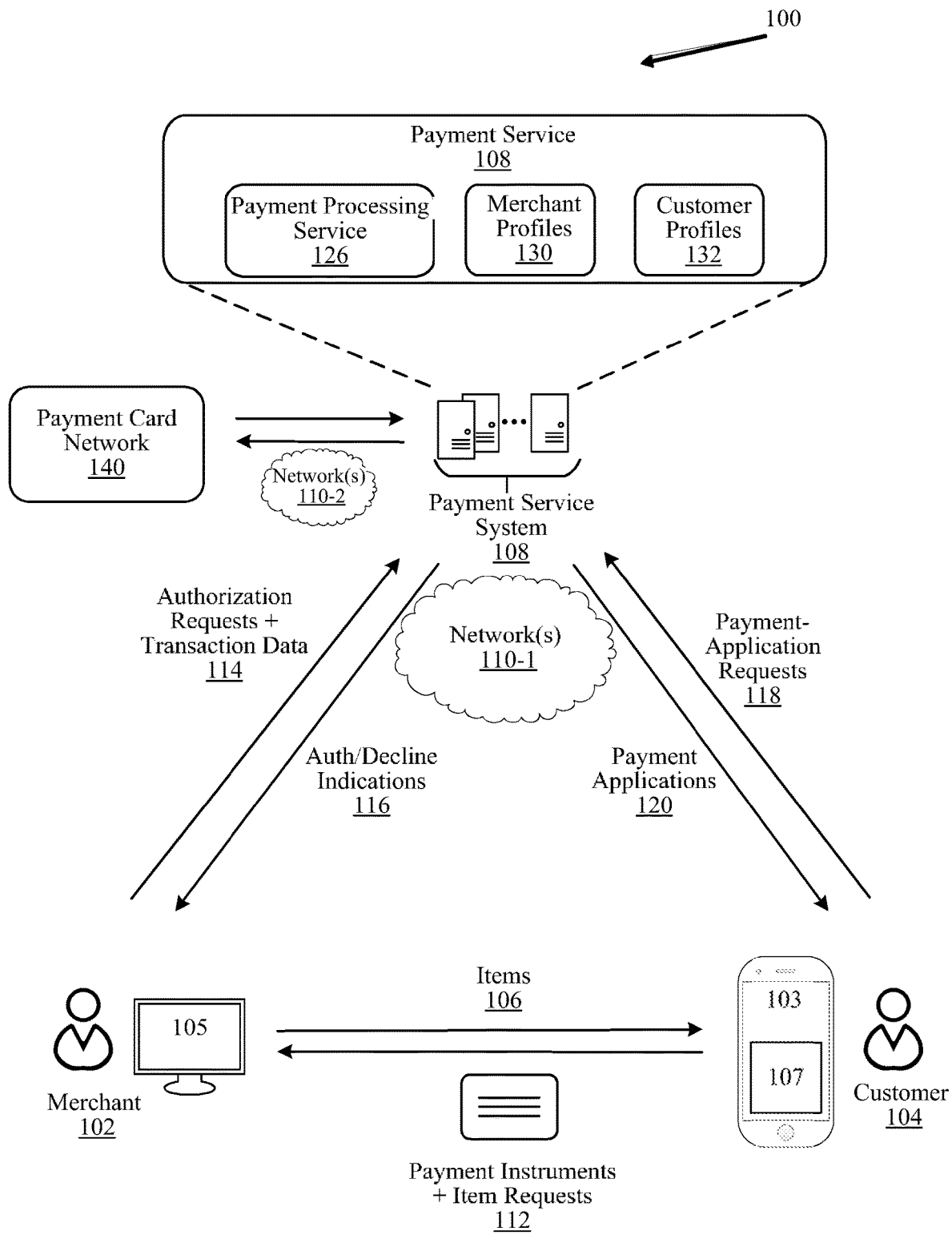
FIGS. 1A and 1B illustrate an example payment service system network according to one embodiment.

Particular embodiments described herein enable management and implementation of debt instruments, such as traditional line, credit and credit card account, or installment loan through a payment service system. Particular embodiments described herein enable a user to access a debt instrument to make a payment for a transaction, request a cash transfer, or request to borrow funds from another consumer. Particular embodiments described herein enable analysis of purchase characteristics of a transaction in order to determine suitable repayment terms for the transaction. Particular embodiments allow for dynamic repayment terms including modification of default repayment terms in real-time based on the characteristics of the transaction. Particular embodiments improve a user's access to a line of credit that improves user repayment through a determination of a repayment schedule that fits the user.

Particular embodiments enable training a machine learning model to classify levels of risk of indebtedness for different user profiles or transaction profile contexts and determine repayment schedules that minimize the level of risk. As an example and not by way of limitation, the machine learning model may be trained to identify high-risk user profiles or transaction profile contexts based on analyzing transaction histories of users. That is, if a user typically spends the majority of their balance on their account, that may lead to an inability to pay back debt. As such, the machine learning model may determine a repayment schedule that reduces the level of risk associated with that particular user of failing to pay back debt. For instance, the machine learning model may determine an optimal repayment schedule would be to spread payments over multiple weeks to enable the user to pay off small amounts of debt at a time. As another example and not by way of limitation, the transaction profile contexts may indicate a context of a transaction and the machine learning model may identify certain transactions (e.g., luxury goods, items of a threshold amount, purchase made in a certain area) that may be a high-risk transaction. The machine learning model may determine a repayment schedule that mitigates the risk of the user failing to pay back debt. The machine learning model may be trained to identify trends associated with high-risk user profiles and/or transaction profile contexts. The machine learning model may be trained to determine a corresponding repayment schedule in order to minimize level of risk of a user failing to pay back debt.

Currently, most purchases using a debt instrument (e.g., a credit card, a line of credit, or an installment loan) come with fixed terms (e.g., a set repayment schedule, an interest rate, a payment due date, and the like). However, some transactions may be determined to be a high-risk transaction than other transactions whereas some transactions may be a low-risk transaction. Additionally, it may solely be the institutions issuing the debt instruments that may change the terms for the debt instrument.

In particular embodiments, a payment service system may provide a platform for its users to access one or more debt instruments that may be associated with their respective accounts. These debt instruments may include a credit card that is may be issued by the payment service system or an entity associated with the payment service system. These debt instruments may also include a line of credit that is associated with a user's account. In particular embodiments, the payment service system may manage one or more financial accounts for the user. These financial accounts may include one or more debt instruments that are available to the user. Each financial account may hold an actual or representative quantity of fiat currency owned by the user or other assets owned or assigned to the user (e.g., securities, cryptocurrency tokens). The payment service system may also have access to one or more financial accounts associated with the user that are managed by one or more third-party systems (e.g., banks).

In particular embodiments, the payment service system may maintain a database designed for recording asset ownership for various users. As an example and not by way of limitation, the payment service system may store one or more ledgers for tracking assets and liabilities held by the payment service system—each such asset or liability being held by the payment service system may be owned in whole or in part by the payment service system itself and/or in whole or in part by one or more users of the payment service system. The ledger(s) may store service balances associated with the payment service system representing quantities of assets or liabilities held by the payment service system. The service balances may comprise, for example, a fiat currency balance for each of one or more fiat currencies, a securities balance for each of one or more security assets, a cryptocurrency balance for each of one or more cryptocurrencies, a liabilities balance for each of one or more debt instruments, other suitable data records, or any combination thereof. The payment service system may also store additional ledgers for each of a number of users. The ledger(s) may be stored as part of a profile for each user. One or more ledgers may store user balances representing quantities of assets held by the payment service system and owned by one or more users. They may have similar contents to the service balances. One or more ledgers may be debt ledgers that track transactions associated with debt instruments of the user. The payment service system may use other data structures suitable for storing information representing ownership of assets.

In particular embodiments, a user may access a debt instrument associated with his or her account through the payment service system by sending a request to access a debt instrument to the payment service system. The user may be conducting a transaction, such as making a purchase at a store via a point-of-sale (POS) device, making an online purchase, sending money via a peer-to-peer (P2P) transaction, requesting a cash advance form a line of credit, or the like. In particular embodiments, a request to access a debt instrument may be automatically sent when the user is using a debt instrument (e.g., a credit card) to make a payment for a transaction. As an example and not by way of limitation, a user may swipe a payment card associated with the user's account and the request may be automatically generated and sent to the payment service system. In particular embodiments, the user may access a user interface to request access to a debt instrument. As an example and not by way of limitation, a user may interact with a mobile application associated with a payment service system or other entity to access a user interface associated with a line of credit or on a webpage displayed by a browser installed on a computing device. The user may interact with one or more elements in a user interface to select to pull (e.g., cash advance) from the line of credit by requesting to transfer a portion of the line of credit to the user's balance. As an example and not by way of limitation, if a user has a balance of $400 on a financial account and wishes to maintain a balance of $300 (e.g., possibly for rent) the user may want to access a line of credit for any purchase greater than $100 to prevent the balance from falling below that amount. As such, the user may pull from a line of credit associated with the financial account (e.g., a line of credit of $200) to transfer a portion of the line of credit for a transaction. The user may input, through one or more elements of a user interface, a value to pull from the line of credit and send a request to the payment service system to transfer the portion of the line of credit to the user's balance.

In particular embodiments, the user may set a balance threshold to prevent the user balance from falling below a threshold amount. As an example and not by way of limitation, a user may set a $300 limit for a balance of a financial account so if any transaction should lower the balance to below the $300 limit, a request may be generated to request a transfer of a portion of a line of credit associated with the financial account to the user's balance. In particular embodiments, the balance threshold may be assigned to a specific transaction (e.g., rent) and that may cause the balance to fall below the balance threshold. As an example and not by way of limitation, the balance threshold may be set for purchases that are not associated with rent or utilities. In particular embodiments, the payment service system may receive the request to pull a portion from the line of credit, and automatically send a request to a computing device associated with the financial account (e.g., a smartphone the user has signed into the financial account) for authorization for the pull from the line of credit. The request may be automatically generated for an amount for a transaction. As an example and not by way of limitation, if a user has a limit set for $300, has a balance of $400, and is looking to purchase groceries for $125, a request to pull $25 from a line of credit associated with the user's financial account may be generated. The payment service system may send a notification of the transaction exceeding a set balance threshold and send a request to the user's smartphone for authorization to approve the pull from the line of credit for $25. In accordance with one embodiment, and prior to sending the authorization to the user, the payment service system may perform a real-time risk assessment of the transaction and generate modified repayment terms for the $25 pull from the line of credit. The modified repayment terms can differ from the default repayment terms associated with the debt instrument (e.g., line of credit) of the user account and are based on the characteristics of the transaction. For example, the payment service system may analyze the characteristics of the request/transaction to determine that it relates to a grocery store purchase (based on geolocation data), a confirmed pull request under $50, and is within a few days or next payroll deposit (based on past transaction history on the payment service). These factors may cause the payment service system to offer modified repayment terms (from default terms) with a shorter repayment schedule and with a lower interest rate. Once the user approves the pull from the line of credit for $25 the payment service system at the identified terms, the transaction may be authorized and the payment service system may update the user account to include the pull from the line of credit at the default or modified repayment terms.

In particular embodiments, the payment service system may identify purchase characteristics of a transaction. The purchase characteristics may include merchant information (e.g., merchant identifier, a merchant inventory information, and the like), whether the transaction is a product or a service, a category associated with the transaction, a date and time associated with the transaction, a merchant category code (MCC) associated with the transaction, and whether the transaction is a luxury item. Other purchase characteristics may be included. The payment service system may extract purchase characteristics from transaction details, request information from the merchant, and other avenues to identify one or more purchase characteristics of a transaction. As an example and not by way of limitation, if a user is attempting to purchase a new laptop through a payment card associated with the financial account, the payment service system may be able to identify from the request, that the transaction is for a new laptop, from a particular merchant, at a particular date and time, and the like. The payment service system may determine a category associated with the transaction or extract it from the transaction details. The payment service system may identify individual items of a transaction and/or group items together in particular categories. As an example and not by way of limitation, if a transaction includes multiple items of different categories, the payment service system may identify each individual category. In particular embodiments, the payment service system may extract one or more feature vectors representing the purchase characteristics and classify each of the feature vectors. The classification of each feature vector and other purchase characteristics may be used to determine a set of terms associated with the transaction as described herein. In particular embodiments, the payment service system may also determine historical repayment data. The historical repayment data may be associated with the user account and/or associated with the transaction. As an example and not by way of limitation, the historical repayment data may be data on how a user pays back debt or how a particular transaction (e.g., a particular model of a car) is paid back. The historical repayment data may be determined by analyzing prior transactions of the user account and/or of similar transactions involving other users of the payment service system. The payment service system may use a machine learning model to assess one or more prior transactions and/or one or more similar transactions to determine the historical repayment data for the transaction. In particular embodiments, the payment service system may access incoming payroll, a deposits activity, cash flow associated with equities or securities, or P2P transactions.

In particular embodiments, the payment service system may dynamically determine a set of terms or repayment terms associated with a transaction that uses a debt instrument. The set of terms or repayment terms may include a payment due date of when to pay off a transaction, a repayment schedule, and an interest rate for a transaction, or a fee associated with the transaction. In particular embodiments, the payment service system may use a machine learning model applied to the incoming payroll, the deposits activity, the cash flow associated with equities or securities, and/or the P2P transactions to generate repayment terms. In particular embodiments, when a user sends a request to access a debt instrument to make a payment for a transaction (e.g., using a payment card or directly with a mobile application on a computing device), the payment service system may determine a set of terms based on purchase characteristics associated with the transaction and historical repayment data. As an example and not by way of limitation, the payment service system may identify through the historical repayment data that the user has a threshold number of missed payments. The payment service system may increase an interest rate associated with the transaction based on the number of missed payments. As an example and not by way of limitation, if the user has missed two payments, the payment service system may increase the interest rate for the transaction by a small amount, but if the user has missed ten payments, the payment service system may increase the interest rate by a large amount or automatically reject an access to a debt instrument. As another example and not by way of limitation, the payment service system may determine a particular category of transactions (e.g., high-end electronics) may be a high-risk transaction, and increase the interest rate associated with a transaction of that category that uses a debt instrument. Conversely, a transaction that is identified as a low-risk transaction (e.g., groceries with a cost that is lower than a threshold amount) may have a reduced interest rate. The payment service system may determine that the transaction includes multiple items of different categories and generate an aggregate set of terms based on the combination of the individual items in the transaction. As an example and not by way of limitation, the payment service system may determine repayment terms associated with each item apply weights to each of the repayment terms to determine an overall set of terms. For instance, the interest rate may be adjusted up or down based on the various risk assessments of each item. Weights may be applied based on a fraction of the cost of the respective item compared to the total cost of the transaction. In particular embodiments, the payment service system may provide an itemized receipt of a transaction. The itemized receipt may be provided to the user to select which item to take a loan out for (e.g., pay with a credit card or pull from a line of credit) to pay for the transaction. With the itemized receipt, individual repayment terms may be shown for each individual item in the transaction based on their respective purchase characteristics. The user may be presented with an option to combine the whole transaction and/or select individual items of the transaction to take a loan out to pay for the respective item. As another example and not by way of limitation, the date and time of a transaction may be used to determine the repayment terms. For example, the payment service system may determine purchases around Christmas time may be high-risk transactions and increase an interest rate for a transaction using a debt instrument during that period of time. The payment service system may also move up a payment due date (to encourage a user to pay back debt before requesting to access a debt instrument) or push back the payment due date (to allow more time for a user to pay back the debt) based on the purchase characteristics or historical repayment data. The payment service system may apply a fee to an amount associated with a transaction using a debt instrument. As an example and not by way of limitation, the payment service system may apply a 2.5% fee for any pull on a line of credit. Like the other set of terms or repayment terms, the fee may change based on any of the purchase characteristics, the historical repayment data, or other data associated with the user account. In particular embodiments, a payment service system may use an identified merchant to determine the repayment terms. As an example and not by way of limitation, a merchant may be running a promotion through the payment service system and advertise a lower interest rate or lower fee to access a debt instrument for transactions at the merchant (or transactions for a particular service or product). The merchant may provide a fee to the payment service system to alter the repayment terms. In particular embodiments, the fee may be charged instead of interest on the pull on the line of credit. As an example and not by way of limitation, if the interest rate associated with the line of credit is typically 20% APR, the line of credit may have a 2.5% fee that may be charged for any pull on the line of credit instead of paying interest on the pull on the line of credit. Therefore, if the user is requesting to pull $20 from the line of credit, then the user has the option to pay $0.50 instead of having interest charged for the pull on the line of credit. In particular embodiments, the user may be a merchant using the payment services of the payment service system. The payment service system may use a machine learning model applied to attributes of an item or service associated with the transaction, a current merchant inventory of the merchant, or a recent transaction activity of the merchant to generate the set of terms or the repayments terms. As an example and not by way of limitation, if the recent transaction activity indicates the merchant is having a slow month, the payment service system may determine a higher interest rate be applied to non-business related purchases (e.g., purchases that are not of a particular category associated with the business of the merchant). The increase in interest rate may deter the merchant from making frivolous purchases.

In particular embodiments, the payment service system may determine a repayment schedule for a transaction using a debt instrument. The payment service system may have a standard or default repayment schedule for transactions using a debt instrument. The payment service system may use a machine learning model applied to the incoming payroll, the deposits activity, the cash flow associated with equities or securities, and/or the P2P transactions to generate a modified repayment schedule. The payment service system may alter the standard repayment schedule based on a generated repayment schedule. This repayment schedule may be customized to optimize repayment of debt instruments. As an example and not by way of limitation, the payment service system may determine that a user gets paid bimonthly and as such set up or modify a repayment schedule that coincides with after a user gets paid (e.g., the next day after pay day). In particular embodiments, the payment service system may receive an indication the user has been paid and deduct a portion of the paycheck to repay debt (credit card, installment loan, etc.). In particular embodiments, the payment service system may use purchase characteristics such as when the transaction took place to determine the repayment schedule. As an example and not by way of limitation, the payment service system may extend a repayment schedule (e.g., from 8 weeks to 10 weeks) for transactions that take place during a shopping holiday. In particular embodiments, the payment service system may determine the repayment schedule based on the amount associated with the transaction. As an example and not by way of limitation, if an amount for a transaction is large, the payment service system may extend the repayment schedule based on historical repayment activity associated with similar transactions on the platform. This may help encourage payback of the debt before accruing any interest. The large transaction may also have a higher interest rate to further encourage payback of the debt in a timely manner. The payment service system may determine a repayment schedule based on the user's income. As an example and not by way of limitation, the payment service system may identify that a user receives a paycheck of $1000 bimonthly and determine the user may be able to pay $100 each paycheck for debt from using debt instruments through a machine learning model. For instance, the machine learning model may determine an amount the user typically spends during a month and determine what portion of the user's paycheck may be allocated to pay off debt. The payment service system may generate shorter repayment schedules based on an amount of the transaction and user's transaction history. That is, as an example and not by way of limitation, if the user requests to access a debt instrument to make a payment for a transaction that is $100 or less, the payment service system may generate a repayment schedule that includes a one-time payment of the cost of the transaction. As another example and not by way of limitation, if the transaction using a debt instrument is for $1000, the payment service system may generate a repayment schedule of 10 weeks.

In particular embodiments, the payment service system may analyze the transaction history of a user, size of the user's network (e.g., how many friends the user conducts transactions with frequently), and third-party information (e.g., credit bureau information) in order to determine whether to approve the user of use of a line of credit and/or another debt instrument. As an example and not by way of limitation, the payment service system may analyze the transaction history, such as incoming cash flow to determine whether the user already has sufficient funds to pay for a transaction and determine does not require a pull on the line of credit in order to pay for a transaction. The payment service system may notify the user in response to determining that the user has sufficient funds in their account for a transaction and does not need a pull from a line of credit. As another example and not by way of limitation, if the user has a large network who the user conducts transactions with frequently (e.g., pay and request money from), then the payment service system may determine the user may have a higher probability of paying off a loan and/or be able to request aid from the user's network.

In particular embodiments, the payment service system may transmit the set of terms or repayment terms to the user for authorization. After the payment service system determines a set of terms or repayment terms associated with a transaction using a debt instrument, the payment service system may transmit the set of repayment terms to the user. As an example and not by way of limitation, the payment service system may send a request for authorization to a computing device associated with the user account, such as the user's smartphone. The set of terms or repayment terms may be presented in a user interface of a mobile application associated with the payment service system to display the set of terms or repayment terms for the user to review. In particular embodiments, the payment service provides multiple sets of repayment term options and may allow the user to alter one or more of the set of terms or the repayment terms such that other repayment terms change dynamically. As an example and not by way of limitation, the user may change the repayment schedule to deduct an amount from the user's balance every week instead of every two weeks, or the user may decide to pay the amount in full on the payment due date. There may be some repayment terms that may be unalterable by the user, such as the payment due date. In particular embodiments, the user may be allotted a number of times to extend a payment due date within a year. The number of times may be based on the historical repayment data associated with the user account. As an example and not by way of limitation, if a user has not missed a payment, the user may be allotted two payment due date extensions in a year. In particular embodiments, the payment service system may implement an automatic deduction from the user's balance as part of the repayment schedule. After the user authorizes the set of terms or repayment terms, the payment service system may update the user account to include the transaction with the set of terms or repayment terms. As an example and not by way of limitation, after the user authorizes the repayment terms, the payment service system may post the transaction with its own repayment terms to the user's account in the transaction history associated with the user account. In particular embodiments, each transaction may have its own individual repayment terms. The payment service system may aggregate each transaction within the user account associated with one or more debt instruments and reorder the transactions based on a user input. As an example and not by way of limitation, the payment service system may reorder the transactions by date, by payment due date, by interest rate, by amount, and the like. In particular embodiments, the payment service system may determine a time period before a user is charged interest for a transaction using a debt instrument and present that to a user through a user interface within a mobile application associated with the payment application. If the user fails to pay off debt associated with a transaction before the time period, the payment service system may apply an interest rate to the remainder of the debt based on the repayment terms of the transaction. The payment service system may update the user account with any changes. In particular embodiments, the user account may be a revolving account that includes dynamic repayment terms for each transaction.

In particular embodiments, the user may request to borrow an amount from another user. As an example and not by way of limitation, the user may request to borrow funds from a friend. The payment service system may facilitate the transaction and determine repayment terms associated with the transaction. The repayment terms may be determined based on the transaction history of both users. The payment service system may use a machine learning model to be applied to the transaction histories of both users to determine repayment terms associated with the transaction. The payment service system may analyze the transaction history of both user to determine whether each are eligible for the transaction. As an example the payment service system may determine whether the user may be able to repay the user after borrowing the amount. The payment service system may also determine whether the lender may have the funds available to loan money to the user. Both of the users may be able to modify the repayment terms and each user may be requested to authorize the final repayment terms. A user may extend an offer to another user to borrow money from the user. This may ignore the eligibility determination of the borrower because the lender is extending the offer. In particular embodiments, the payment service system may determine an optimum time for users to request to borrow an amount from another user. As an example and not by way of limitation, if a user attempts to request money from another user, the payment service system may determine whether the potential lender has the sufficient funds for the requestor. The payment service system may determine the potential lender does not have sufficient funds at the moment, but usually gets paid on a certain day of the month and notify the user to request at a later date. In particular embodiments, depending on transaction history between users, the payment service system may notify the user of specific details of when to request. As an example and not by way of limitation, if two users frequently pay and request money from each other (e.g., indicating a strong relationship), then the payment service system may notify the requestor that the potential lender typically does not get paid until the end of the month. However, if the two users do not have frequent transactions between the two, then the payment service system may indicate to the user that currently is not a best time to request and/or simply deny the request to borrow money from the potential lender.

In particular embodiments, the repayment terms may comprise a set percentage or an amount to subtract from incoming cash. As an example and not by way of limitation, instead of paying an amount every week (e.g., $20 every Friday) for a set term, a user may select (if the option is enabled for the user) to have a percentage of incoming money to be deducted in order to pay back a transaction, loan, etc. For instance, if a user decides to borrow $100 and chooses to pay through a percentage of incoming money, then whenever money is sent to the user, a percentage (e.g., 10% of the money) is taken out to repay the borrowed money until the loan is repaid. In particular embodiments, the option to select a set percentage may be offered to users based on transaction history, repayment history, and other parameters. In particular embodiments, the repayment of a loan may have the repayment terms updated so it may switch from a set amount every week (e.g., $20 every week) to a set percentage of incoming money (e.g., 5% every time money enters a user's account). The user may be offered by the payment service system after the payment service system determines the user may be eligible. As an example and not by way of limitation, the user may request to switch in the instance the user lost their job and the payment service system may determine the user is eligible. One or more transactions that need to be repaid may switch repayment terms based on a determination of eligibility by the payment service system. In particular embodiments, if the user is borrowing from another user, the potential lender may offer the option and/or the borrower may request to repay the potential lender through a percentage of incoming money.

In particular embodiments, the payment service system may consolidate multiple transactions that each have their own repayment terms. As an example and not by way of limitation, if a user has two transactions with different repayment terms, the payment service system may combine the two transactions so the user will only have to repay one transaction. The payment service system may calculate new repayment terms for the consolidated transaction. In particular embodiments, the user may request to consolidate two or more transactions each with their respective repayment terms. In particular embodiments, if two or more transactions have the same repayment terms (e.g., they have the default repayment terms), then the two or more transactions may be combined by default. In particular embodiments, an event may trigger a consolidation of multiple transactions. When the payment service system detects the event, the event may trigger a consolidation of two or more transactions with new repayment terms to be presented to the user for authorization. As an example and not by way of limitation, the payment service system may detect that a user has an increase in income through a third-party (e.g., a bank) and may be able to pay off more debt at a given time. If the user is a merchant, the event may be a new employee added to the payroll of the merchant or an increase in sales activity compared to a historical trend. In response to the event, the payment service system may generate a new consolidated transaction offer, where the consolidated transaction offer combines two or more transactions that need to be repaid with new repayment terms. The consolidated transaction offer may be presented to the user to be accepted. Upon authorization from the user (e.g., the user accepts the consolidated transaction offer), the payment service system may update the user account to show the new consolidated transaction offer. The consolidated transaction offer may have repayment terms that change based on the detected event. As an example and not by way of limitation, if the payment service system detects that the user has an increased cash flow this month (e.g., the user deposits a large amount of money), then the payment service system may generate a consolidated transaction offer to consolidate multiple transactions to be repaid with more favorable terms (e.g., reduced interest rate with a shortened repayment schedule) to encourage the user to pay off the multiple transactions faster.

In particular embodiments, the payment service system may send notifications to a user through the user's computing device to remind the user of scheduled repayments. The user may opt-in or opt-out of an automatic scheduled deduction of the user's balance. In particular embodiments, the user's ability to opt-in or opt-out of an automatic scheduled deduction of the user's balance may be based on a risk level of the user. As an example and not by way of limitation, if the user is classified as a high-risk user, the payment service system 108 may prevent the user from opting out of the automatic scheduled deduction of the user's balance.

In particular embodiments, machine learning algorithms may be used to build a mathematical model of sample data, known as "training data", in order to make predictions or decisions without being explicitly programmed to perform the task. In particular embodiments, a computing system (e.g., computing systems associated with a payment service system) may leverage machine learning models to improve the efficiency and effectiveness of transaction data analysis. Transaction data analysis may include the analysis of any suitable transaction data, such as prior transactions, transaction histories of users, transactions of a particular category, etc. Additionally, these machine learning models may analyze user profiles, user repayment histories, transaction profile characteristics in order to determine a level of risk associated with each transaction. The machine learning model may be trained on a plurality of transaction examples each having their own corresponding user profile, user repayment history, and transaction profile characteristics. As an example and not by way of limitation, the machine learning model may be trained to identify a risk level of a user profile. For instance, a person who pays off debt on time or in advance and has a substantial balance to pay off debt may be classified as a low-risk user profile. As such, any transaction this particular user makes would generally be classified as low risk. The machine learning model may determine one or more flexible repayment schedules for the user to following in paying off debt.

In particular embodiments, the machine learning models may be supervised, semi-supervised, or unsupervised. The machine learning models may be based on regression learning, reinforcement learning, decision trees, random forest, support vector machines, neural networks, or any suitable learning algorithms. In particular embodiments, the computing system may use neural network based machine learning models for transaction data analysis. As an example and not by way of limitation, the neural network based models may comprise one or more of convolutional neural networks, long-short term memory units, or recurrent neural networks, or any combination thereof.

A neural network is a system of interconnected artificial "neurons" that exchange messages between each other. The connections have numeric weights that are tuned during the training process, so that a properly trained network will respond correctly when presented with an image or pattern to recognize. The network consists of multiple layers of feature-detecting "neurons". Each layer has many neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger function (for example, using a sigmoid response function). Deep neural networks (DNN) have shown significant improvements in several application domains.

In particular embodiments, the payment service system may increase the network speed and increase bandwidth across the network through implementation of dynamically generating repayment terms for a transaction by determining optimal repayment terms for a user to repay debt associated with the transaction. By determining the optimal repayment terms for a user to repay debt using a machine learning model, the payment service system reduces the amount of users reapplying for loans after being denied. Additionally, the payment service system reduces the amount of users defaulting on repaying debt through the use of a machine learning model to optimize repayment of debt. Thereby, reducing the amount of resources needed to collect payment from users that have defaulted. The payment service system may reduce network bandwidth consumed through enhancing distributed systems by using data structures to intelligently adjust balances of users and merchants corresponding to transactions. As an example and not by way of limitation, a user may opt-in to schedule automatic repayment of a transaction using a debt instrument, which the payment service system may adjust balances of users based on the generated repayment terms. In particular embodiments, consolidation of multiple transactions to be repaid, may reduce the amount of resources used to manage the transactions by combining the multiple transaction into one consolidated transaction. The payment service system may, as a result of consolidating transactions, need to process one transaction as opposed to multiple transactions (e.g., transfer funds from user account a single time as opposed to multiple times for several transactions and at different times).

The embodiments disclosed herein are only examples, and the scope of this disclosure is not limited to them. Particular embodiments may include all, some, or none of the components, elements, features, functions, operations, or steps of the embodiments disclosed above. Embodiments disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject matter which may be claimed comprises not only the combination of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

FIG. 1A illustrates an example payment service system network environment 100.

Merchant 102 may conduct transactions with customer 104 (or "user 104") for items 106 offered by the merchant 102. FIG. 1A also illustrates a payment service system 108 (also referred to as "payment service"), coupled to merchant point-of-sale (POS) device 105 and customer device 103 via a network 110-1, to authorize payment instruments of customer 104.

Customer 104 may engage in transactions with merchant 102 to purchase items (e.g., goods or services offered by the merchant 102) 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application 107 on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, Visa (EMV) standard, i.e., EMV cards. In other examples, other types of payment instruments include cards or computing devices that communicate via radio frequencies such as a radio frequency identification tags, and near field communication devices, etc. In other examples, other types of payment instruments may include debt instruments, such as a credit card or a line of credit.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service system 108 over network 110-1, either substantially contemporaneously with the conducting of the transaction (in the case of online transactions) or later when POS device 105 is in the online mode (as in the case of offline transactions). In particular embodiments, the transaction information may comprise the purchase characteristics of the transaction.

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, identity and/or contact information of the customer, and a payment instrument used in the transaction. After conducting an offline transaction with customer 104, POS device 105 may provide the stored information (or some subset of it) to the payment service system 108 over the network 110-1. The network 110-1 may represent any one or more wired or wireless networks, such as a Wi-Fi network, a cellular network, or the like. In an online transaction, POS device 105 may send this information to payment service system 108 over network 110-1 substantially contemporaneously with the transaction with the customer.

After merchant 102 receives the payment information from customer 104, merchant 102 may send respective authorization requests, along with information regarding the respective transactions, to payment service system 108, as illustrated at 114. Payment service system 108 may include payment processing service 126, merchant profiles 130, and customer profiles 132. Here, the merchant profiles 130 may comprise information about one or more merchants using the payment service system 108. The customer profiles 132 may comprise information about one or more customers using the payment service system 108. Each merchant or customer may otherwise be called a user of the payment service system 108. A particular user may be a merchant, a customer, or either depending on the use case.

The payment processing service 126 may receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

When a customer and a merchant enter into an electronic payment transaction, the transaction may be processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110-2 to conduct financial transactions electronically. Payment processing service 126 may also communicate with one or more computing devices of one or more banks, processing/acquiring services, or the like over the network 110-2. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service system 108.

An acquiring bank may be a registered member of a card association (e.g., Visa®, MasterCard®), and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service system 108 may communicate over network(s) with one or more cryptocurrency networks. Such networks may include for example, the Bitcoin network, the Ethereum network, etc. Cryptocurrency networks are associated with a network of parties that cryptographically verify and validate transactions and record transactions on copies of a distributed ledger commonly called the blockchain. Once a transaction has been validated, a cryptocurrency network may approve the transaction by writing the transaction to the blockchain. The time for such processes to complete may be impractically long for many applications.

Networks 110-1, 110-2 may represent any one or more wired or wireless networks, such as a Wi-Fi network, a cellular network, a wide area network, a local area network, or the like. For the purposes of illustration, networks 110-1, 110-2 are shown as separate networks. In particular embodiments, networks 110-1, 110-2 may be the same network, subnets of the same network, one or more separate networks, or other suitable arrangement.

While FIG. 1A illustrates merchants 102 sending the transaction data directly to the payment service system 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective profiles of the merchants 102. For instance, the merchant profiles 130 may indicate a class or category of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) may determine when the customer visits physical premises or a digital presence of the merchant. For instance, the device 103 of the customer 104 may include an application 107 (e.g., an application provided by payment service system 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service system 108 may determine when the customer is present at the merchant in any other number of ways. In each instance, after payment service system 108 receives an indication that customer 104 is located at merchant 102, the payment service system 108 may determine whether to send one or more previously expressed item preferences of the customer to the merchant.

In addition, customer 104 may desire to receive an instance of a payments application 107, such as a mobile wallet application, from the payment service system 108. FIG. 1A illustrates, at 118, that the customer 104 may send payment-application requests to payment service system 108. In response, at 120, payment service system 108 may provide instances of the application 107 back to customer device 103. In addition, payment service system 108 may map an identification of the instance of the application 107 to the customer profile.

According to an implementation of the present subject matter, the customers and merchants may send and receive payments in security assets via the payment service system for purchase of items or a selected set of items. In another implementation, the customers may send payments in security assets via the payment service system, while the payment service system converts a security asset into another asset of the merchant's choice. In another implementation, the customers may designate particular security assets to be sold with the express purpose of putting some or all of the proceeds from the sale towards settling a bill with the merchants.

Figure 1B:
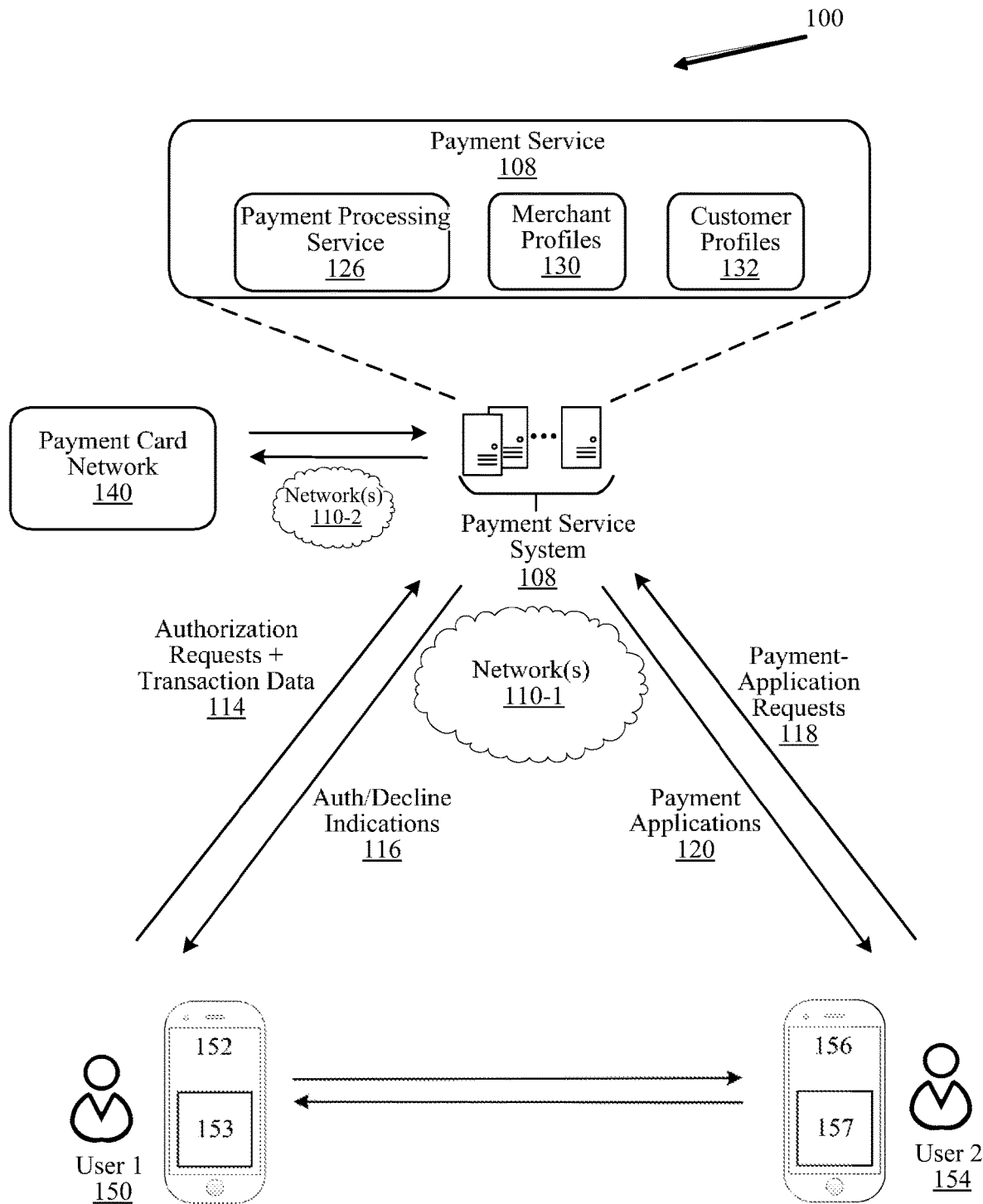

FIG. 1B illustrates another embodiment of example environment 100. FIG. 1B includes many of the same components as the embodiment of example environment 100, except that in FIG. 1B a transaction is between an operating device 152 of a first user 150, and an operating device 156 of a second user 154. For all other components, the descriptions above with respect to at least FIG. 1A apply. Devices 152 and 156 may be a computing device with applications 153 and 157, respectively, provided by payment service system 108 executing thereon. In some embodiments, one or more of the applications 153 and 157 may be point-of-sale applications. In some embodiments, one or more of the applications 153 and 157 may be mobile wallet applications. In some embodiments, one or more of the applications 153 and 157 may be applications provided by a third party capable of accessing at least one payment account.

FIG. 1B illustrates a broader concept—that the present technology contemplates that currency or assets may be sent from any party of any character (merchant, user, bank, etc.) to any other party of any character using the innovations described herein.

In particular, any of the examples described as interactions or transactions between a merchant and a user may be performed between two users 150 and 154. According to an implementation of the present subject matter, the users 150 and 154 may send and receive payments in security assets via the payment service system 108 for purchase of items or a selected set of items. In another implementation, a user 150 may send payments in security assets via the payment service system 108, while the payment service system 108 converts the security asset from the first user 150 into another asset of the second user's 154 choice. In another implementation, the first user 150 may designate particular security assets to be sold with the express purpose of putting some or all of the proceeds from the sale towards settling a bill with the second user 154. In another implementation, the first user 150 may designate particular security assets to be sold with the express purpose of putting some or all of the proceeds from the sale towards providing a loan to the second user 154 through the payment service system. In this implementation, the first user 150 may designate a requested form of repayment (e.g., repayment in a particular currency, the same security asset, one or more other specified security assets, any other security assets, or a mixture of different security assets, types of the security assets, or security assets and currency). The second user 154 may repay the loan provided by the first user 150 through the payment service. The payment service system 108 may facilitate fulfillment of the required form of repayment by automatically converting a payment option provided by the second user 154 (e.g., currency or a designate amount of a security asset) to the designated security required form of repayment. The payment service system allows for a more expansive array of payment options, transactions that are completed more quickly and accurately by reducing the communication and processing times needed for computing systems of various parties to authorize and process the transactions and simplifies the interactions and interfaces that a user must engage with in order to prepare and request the transactions. Taken together, these improvements amount to an overall improvement over previous payment processing systems and related devices. The payment service system therefore includes significant technical advantages and improvements over previous devices.

Figure 2:
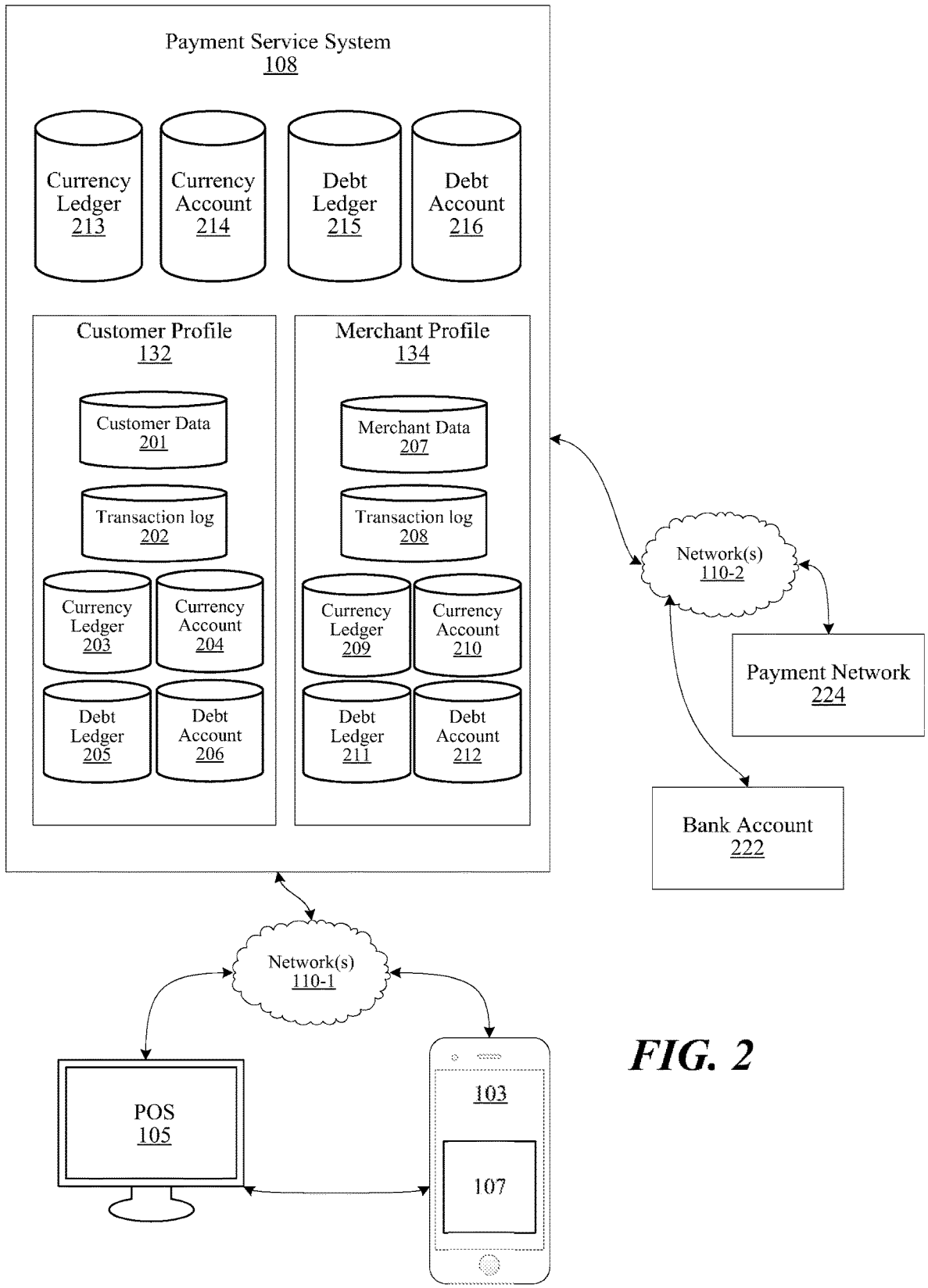
FIG. 2 illustrates an example system architecture for a payment service system according to one embodiment.

FIG. 2 illustrates an example system architecture for a payment service system 108. In particular embodiments, the payment service system 108 may store customer profile 132 for each of a plurality of customers. Customer profile 132 may include customer data 201 that may include customer-identifying information (name, contact information, demographical data, etc.), a transaction log 202 including records of past transactions involving payment service system 108 by customer 104, information regarding linked accounts (credit card information, bank account information, etc.), information regarding services utilized by customer profile 132 (e.g., a mobile wallet application). The customer data 201 may further comprise information associated with one or more social or peer-to-peer contacts of a user (e.g., friends, family members, online network connections). The information may comprise at least part of the profile information of such contacts.

The customer profile 132 may also include a ledger for any accounts managed by payment service system 108 on behalf of customer 104. It will be appreciated that customers having accounts managed by the payment service system 108 is an aspect of the technology that enables technical advantages of increased processing speed and improved security. For example, the customer profile 132 may include a currency ledger 203. The currency ledger 203 may store a balance for each of one or more currencies (e.g., US dollar, Euro, bitcoin) that the customer owns. The currency ledger may include information regarding one or more separate accounts of the user that each include currency owned by the customer. The payment service system 132 may also manage or maintain one or more currency accounts 204 on behalf of the user. The currency accounts 204 may include a logical division of currency held by the payment service system 108 that is allocated for the customer's use. The customer profile 132 may also include a debt ledger 205. The debt ledger 205 may store a balance for each of one or more debt instruments (e.g., credit card, line of credit, loan) that the customer owns. The debt ledger may include information regarding one or more separate debt accounts 206 of the user that each include debt instruments owned by the user. The payment service system 108, or one or more third-parties acting on behalf of the payment service system 108, may manage and maintain the debt accounts 206 for the user. The debt accounts 206 may include a logical division of debt instruments held by the payment service system 108 that is allocated for the customer's use. The currency ledger 203 and the debt ledger 205 may utilize any suitable data structure. As an example and not by way of limitation, a separate ledger may be used to record information about each individual asset or debt owned by the customer. Various ledgers associated with a particular customer may be stored all together, in groups, or separately. As another example and not by way of limitation, the currency ledger 203 and the debt ledger 205 may be logical ledgers. The associated the ledgers may all be saved in a single file, data set, or database. In other words, a customer's ownership interest in a plurality of types of assets (e.g., fiat currency, cryptocurrency, security assets) may all be recorded in a composite ledger or be separately recorded in a plurality of ledgers.

Each account ledger (203, 205) may reflect a positive balance or negative balance when customer 104 funds or pulls from the accounts (204, 206). An account may be funded by transferring currency in the form associated with the account from an external account (e.g., transferring a quantity of cash to payment service system 108 and the value is credited as a balance in currency ledger 203), or by purchasing currency in the form associated with the account from the payment service system 108 using currency in a different form, or by conducting a transaction with another user (customer or merchant) of the payment service system 108 wherein the account receives incoming currency. An account may be funded by receiving a request to access a debt instrument. When a customer requests to access a debt instrument from the payment service system 108, the payment service system 108 may debit a balance stored in the currency account 204 or on the currency ledger 203 and credit a balance stored in the debt account 206 or on the debt ledger 205.

Similarly, as introduced with respect to FIGS. 1A and 1B, payment service system 108 may store merchant profile 134. The merchant profile 134 may comprise merchant data 207, transaction log 208, currency ledger 209, currency account 210, debt ledger 211, and debt account 212. The merchant data 207 may comprise one or more preference settings associated with the merchant 102, such as a type of currency or asset that the merchant prefer to receive as payment. The information stored in the merchant profile 134 may be made accessible and managed by a merchant 102 through a POS device 105 or other suitable devices associated with the merchant 102. Operations, including maintenance and management operations, described with respect to the customer profile 132 and information included therein (e.g., the customer data 201, transaction log 202, currency ledger 203, currency account 204, debt ledger 205, and debt account 206) are as much applicable to the merchant profile 134 and the information included therein (e.g., the merchant data 207, transaction log 208, currency ledger 209, currency account 210, debt ledger 211, and debt account 212).

The payment service system 108 may maintain a currency ledger 213 recording a quantity of cash or other currencies held by the payment service system 108. The quantity of cash or other currencies held by the payment service system may, for example, be held in one or more currency accounts 214. The payment service system may maintain a debt ledger 215 recording a quantity of debt instruments held by the payment service system 108. The quantity of debt instruments held by the payment service system 108 may, for example, be held in one or more debt accounts 216. The currency ledger 213 and the debt ledger 215 may also specify the portion of the assets held by the payment service system 108 (e.g., through the currency accounts 214 and debt accounts 216) that is owned by one or more users of the payment service system 108 and the portion of the assets that is owned by the payment service system 108. When the payment service system 108 has its own holdings of debt instruments, customers may request access to debt instruments directly from the payment service system 108.

When two users (e.g., users 150 and 154) engage in a transaction that involves a transfer of assets, such a transaction may be reflected on the ledgers associated with each customer's profile 132. As an example and not by way of limitation, a first user 150 may transfer a quantity of currency assets to a second user 154. The payment service system 108 may accordingly debit the currency ledger 203 (and corresponding currency account 204) of the first user 150 and credit the currency ledger 203 (and corresponding currency account 204) of the second user 154.

Additionally, customer 104 may also have one or more external payment cards registered with payment service system 108. The external payment cards may be associated with external bank accounts 222. The external payment card accounts may not be managed by payment service system 108. Instead, an appropriate external payment network 224 may process transactions conducted with payment cards.

Additionally, customer 104 may also have one or more internal payment cards registered with payment service system 108. Internal payment cards may be linked to all accounts associated with customer profile 132. In some embodiments, options with respect to internal payment cards may be adjusted and managed using a payment application 107 installed on the customer device 103. For example, when customer profile 132 includes multiple payment accounts (e.g., cryptocurrency, fiat currency, and debt instruments), application 107 may set one of those accounts to be the default account for debits or credits when using an internal payment card.

Customer 104 may access and monitor customer profile 132 including payment cards registered with payment service system 108, currency ledger 203, currency account 204, debt ledger 205, and debt account 206 through the application 107 installed on the customer device 103. The application 107 may be a customer facing application provided by payment service system 108, or that is configured to access customer profile 132 through use of one or more APIs provided by payment service system 108. In some embodiments, application 107 on the customer device 103 may provide digital wallet functionality including storing payment methods and permitting electronic payments by customer device 103 at the instruction of application 107.

The payment service system 108 may receive user settings regarding a currency account. For example, a user may set a balance limit for the currency account. The balance limit may be a require balance for the currency account.

Figure 3A:
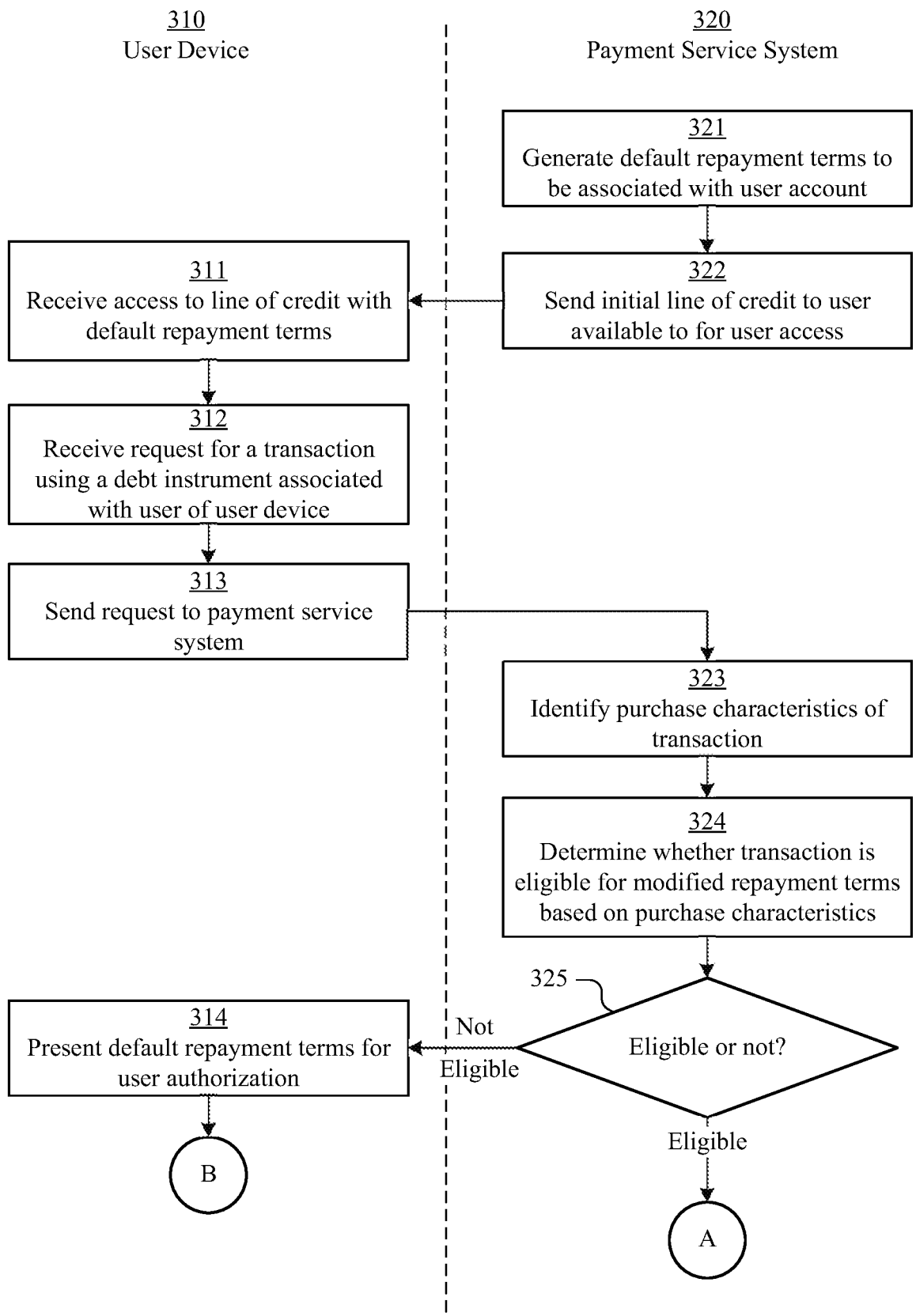
FIGS. 3A-3B illustrates a process for generating repayment terms for a transaction in accordance with an example embodiment.
Figure 3B:
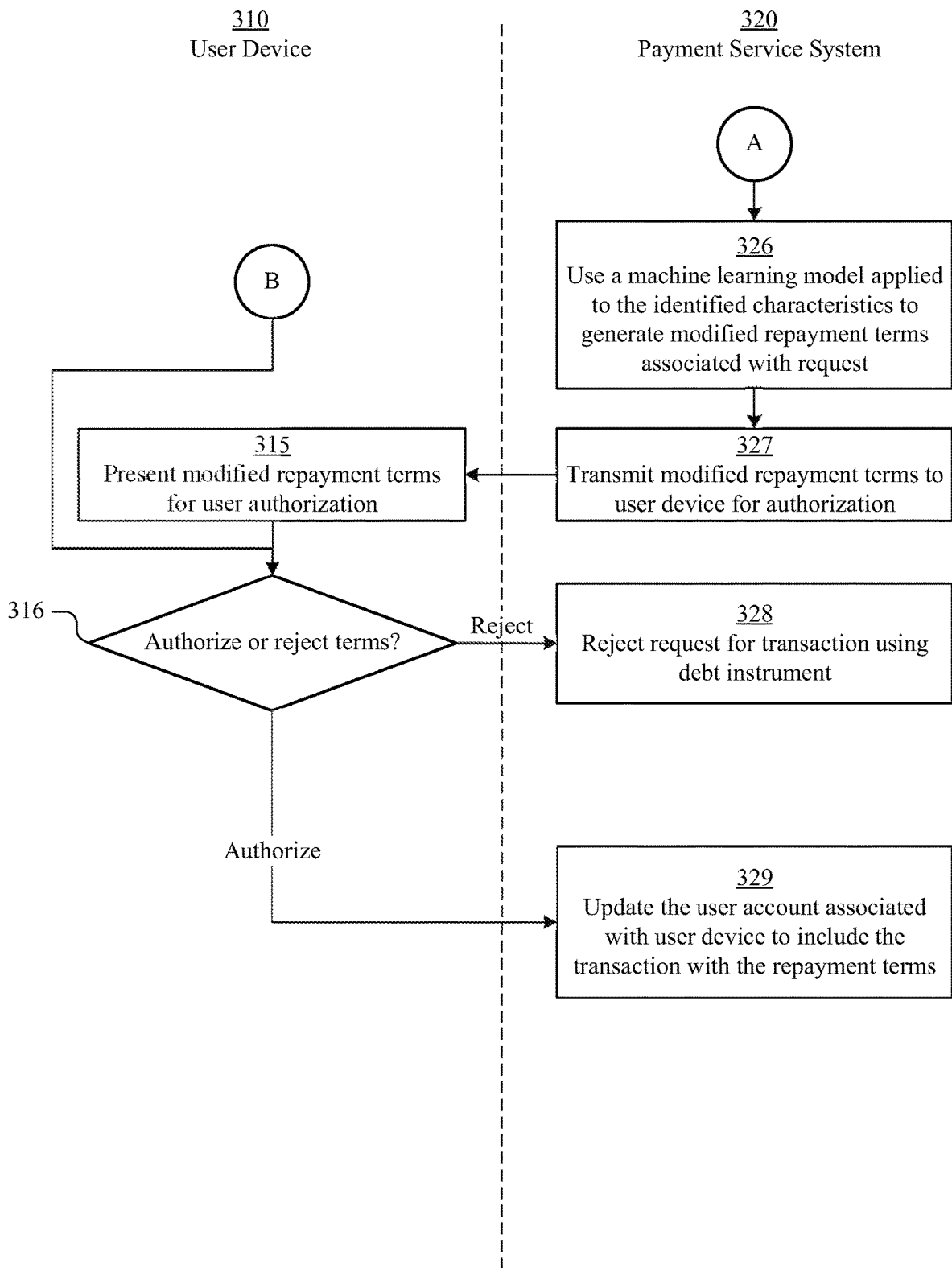

FIGS. 3A-3B illustrate the interactions between various actors, including the payment service system 320 and a user device 310, in a process for generating repayment terms for a transaction. In reviewing FIG. 3A, the process generally advances as the blocks representing steps of the process proceed from the top of the figure downward so that, even if an arrow does not connect blocks, a first block (e.g., the block for step 312) above a second block (e.g., the block for step 323) will generally occur first in the process. The process may begin at step 321, in which a payment service system 320 may generate default repayment terms to be associated with a user account. The payment service system 320 may analyze the user's transaction history and determine the user is running low on funds and determine the user may need a line of credit. At step 322, the payment service system 320 may send an initial line of credit to the user, which will be available for the user to access. The user device 310 may receive the access to the line of credit with default repayment terms. The user device 310 may display the line of credit to the user in an application. At step 312, the user device 310 may receive a request to access a debt instrument to make a payment for a transaction. For example, a user may input a request in an application to access a debt instrument. As another example, the user may use a payment card (i.e., a debt instrument) to pay for a transaction. The user device 310 may send the request to the payment service system 320 in step 313. After the payment service system 320 receives the request, in step 323, the payment service system 320 may identify purchase characteristics of the transaction. In particular embodiments, the payment service system 320 may extract the purchase characteristics from the transaction details or request the purchase characteristics from the merchant. After the payment service system 320 extracts the purchase characteristics, the payment service system 320, in step 324, may determine whether the transaction is eligible for modified repayment terms based on purchase characteristics. In step 325, if the transaction is not eligible then the process may proceed to step 314, where the user device 310 presents default repayment terms for user authorization. In step 325, if the transaction is eligible, the process proceeds to step 326 of FIG. 3B, where the payment service system 320 may use a machine learning model applied to the identified purchase characteristics to generate repayment terms associated with the request. For example, the payment service system 320 may determine an interest rate associated with the transaction based on the purchase characteristics. At step 327, the payments service system 320 may transmit the repayment terms to the user device 310 for authorization of repayment terms. After the user device 310 receives the repayment terms, at step 315, the user device 310 presents the repayment terms for user authorization. At step 316, a determination of whether the user device 310 receives authorization or a rejection may be made. If the user rejects the repayment terms, the process proceeds to step 328, where the user device 310 sends over the user rejection to the payment service system 320 and the payment service system 320 may reject the request to access the debt instrument to make a payment for the transaction. If the user authorizes the repayment terms by approving the repayment terms, the process proceeds to step 329, where the user device 310 sends over the user authorization to the payment service system 320 and the payment service system 320 may update the user account associated with the user device 310 to include the transaction with the repayment terms. This may include establishing a repayment schedule with a determined fee associated with the transaction and an interest rate charged to any leftover amount if the user is delinquent on paying off the debt. The process further enables significant new interactions because the user device and the payment service system as described throughout.

Figure 4A:
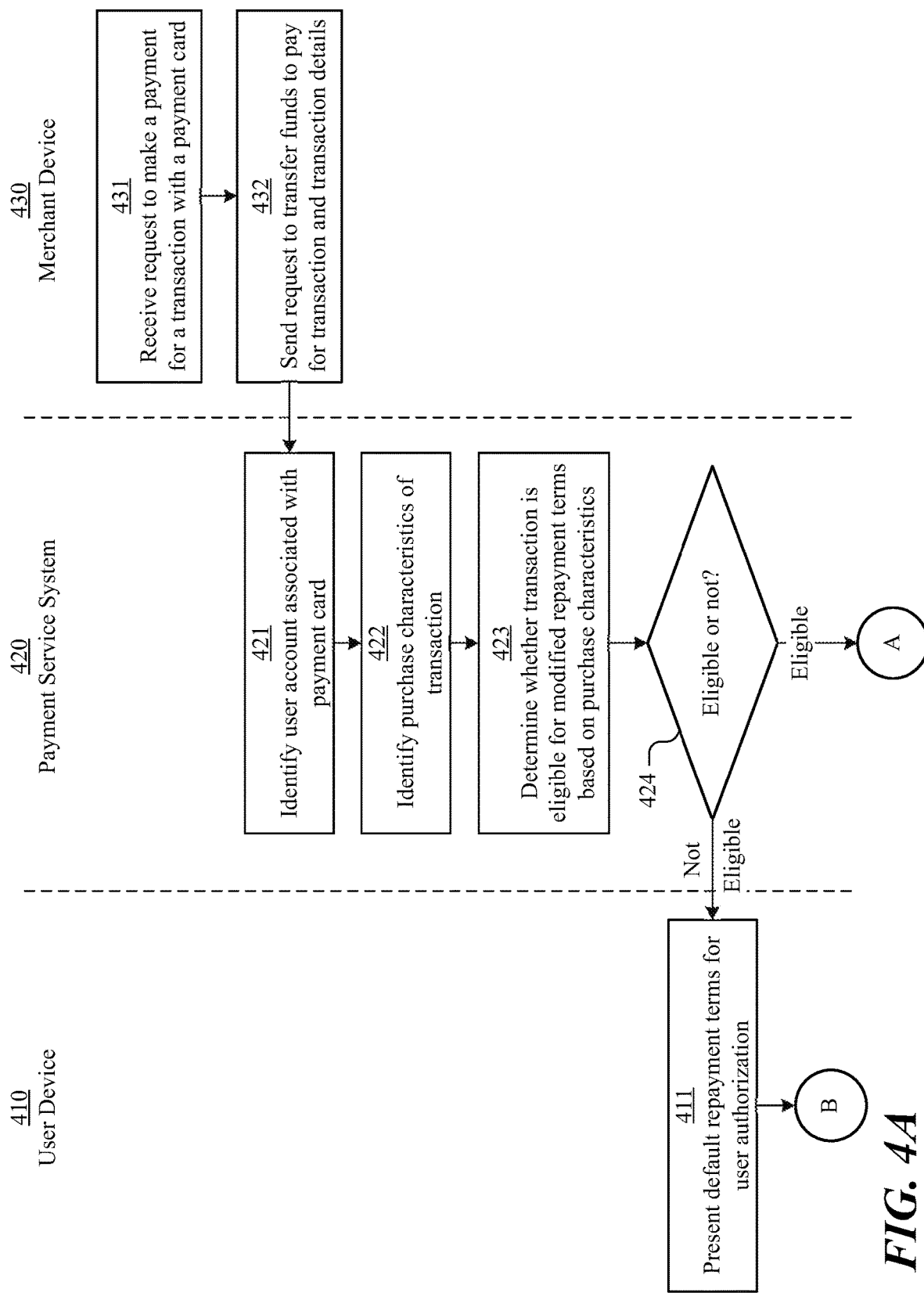
FIGS. 4A-4B illustrates a process for generating repayment terms for a transaction using a payment card in accordance with an example embodiment.
Figure 4B:
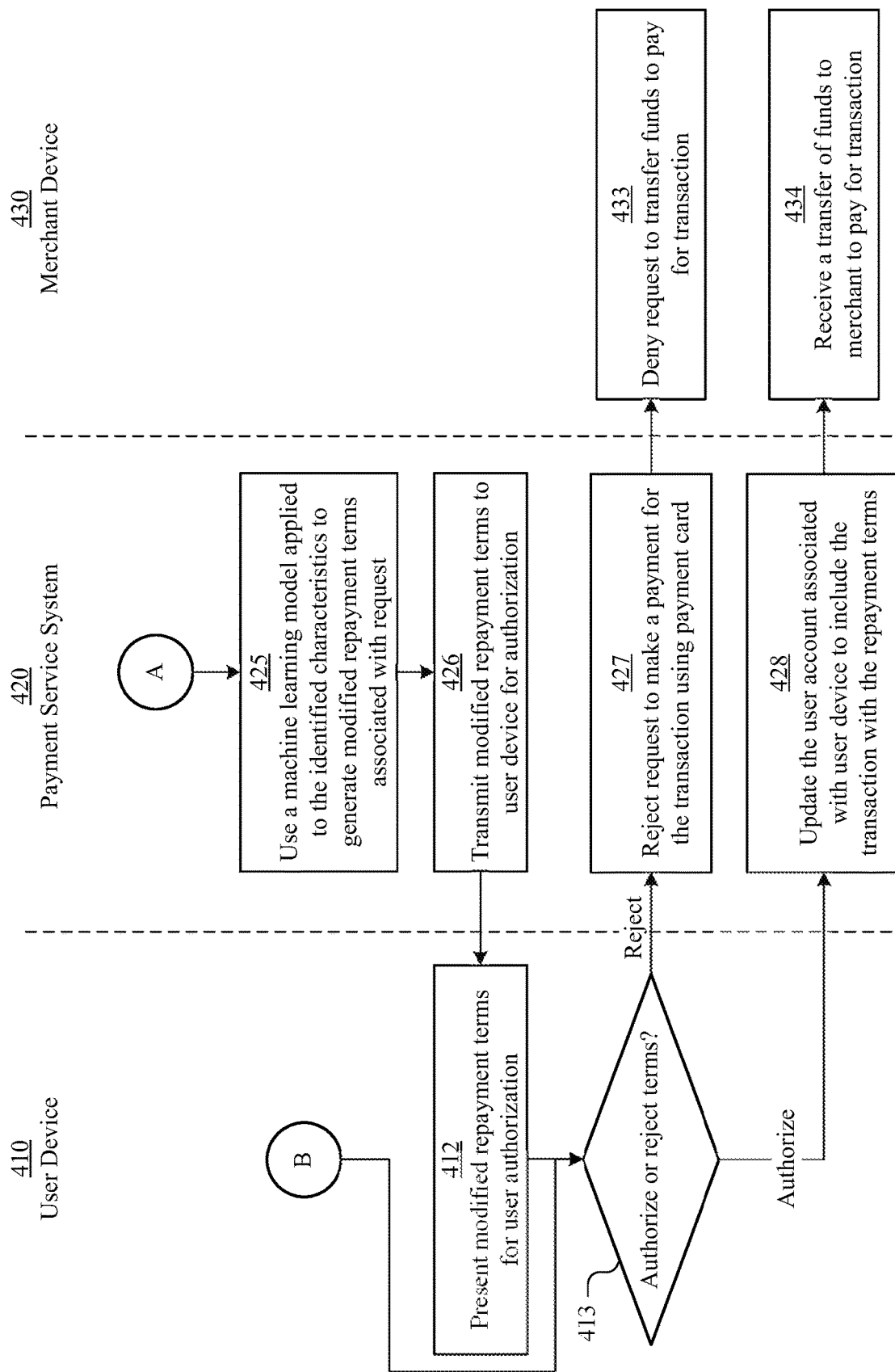

FIGS. 4A-4B illustrate the interactions between various actors, including the payment service system 420, a user device 410, and a merchant device 430, in a process for generating repayment terms for a transaction using a payment card. In reviewing FIG. 4A, the process generally advances as the blocks representing steps of the process proceed from the top of the figure downward so that, even if an arrow does not connect blocks, a first block (e.g., the block for step 431) above a second block (e.g., the block for step 422) will generally occur first in the process. The process may begin at step 431, in which a merchant device 430 may receive a request to make a payment for a transaction with a payment card. Then, at step 432, the merchant device 430 may send a request to transfer funds to pay for the transaction and transaction details associated with the transaction. The request to transfer funds may be associated with the payment card used in the transaction. At step 421, the payment service system 420 may identify a user account associated with the payment card. The payment service system 420 may identify the purchase characteristics of the transaction. In particular embodiments, the payment service system 420 may extract the purchase characteristics from the transaction details or request the purchase characteristics from the merchant. After the payment service system 420 extracts the purchase characteristics, the payment service system 420, in step 423, may determine whether the transaction is eligible for modified repayment terms based on purchase characteristics. In step 424, if the transaction is not eligible then the process may proceed to step 411, where the user device 410 presents default repayment terms for user authorization. In step 424, if the transaction is eligible, the process proceeds to step 425 of FIG. 4B, where the payment service system 420 may use a machine learning model applied to the identified purchase characteristics to generate repayment terms associated with the request. For example, the payment service system 420 may determine an interest rate associated with the transaction based on the purchase characteristics. At step 426, the payments service system 420 may transmit the repayment terms to the user device 410 for authorization of repayment terms. After the user device 410 receives the repayment terms, at step 412, the user device 410 presents the repayment terms for user authorization. At step 413, a determination of whether the user device 410 receives authorization or a rejection may be made. If the user rejects the repayment terms, the process proceeds to step 427, where the user device 410 sends over the user rejection to the payment service system 420 and the payment service system 420 may reject the request to access make a payment for the transaction using the payment card. After the payment service system 420 rejects the request, the payment service system 420 may send a rejection to the merchant device, where, at step 433, the merchant device 430 may deny the request to transfer funds to pay for the transaction. If the user authorizes the repayment terms by approving the repayment terms, the process proceeds to step 428, where the user device 410 sends over the user authorization to the payment service system 420 and the payment service system 420 may update the user account associated with the user device 410 to include the transaction with the repayment terms. After the user account is updated, at step 434, the merchant device 430 may receive a transfer of the funds to the merchant to pay for the transaction. This may include establishing a repayment schedule with a determined fee associated with the transaction and an interest rate charged to any leftover amount if the user is delinquent on paying off the debt. The process further enables significant new interactions because the user device, the payment service system, and the merchant device as described throughout.

Figure 5A:
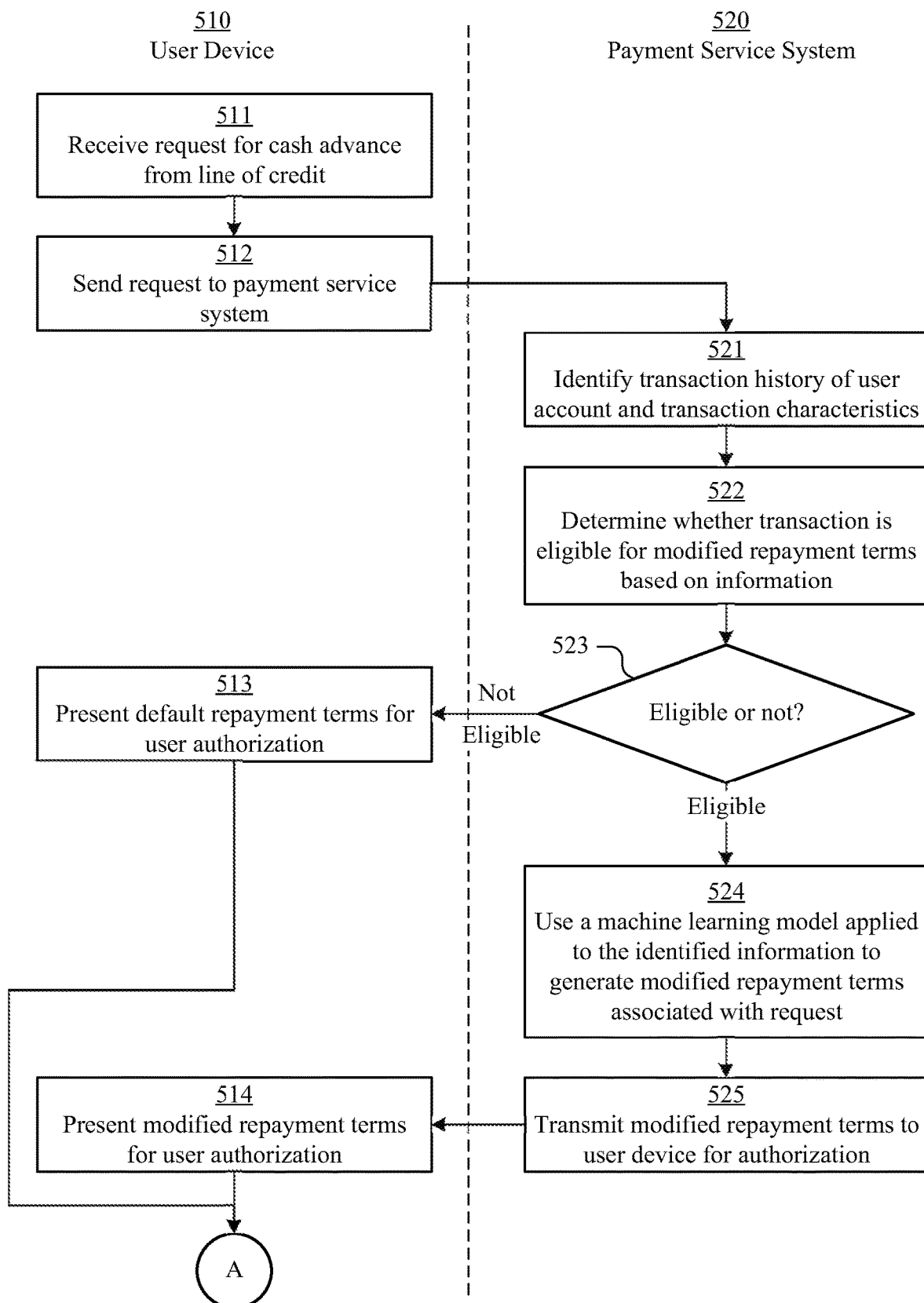
FIGS. 5A-5B illustrates a process for generating repayment terms for accessing a line of credit in accordance with an example embodiment.
Figure 5B:
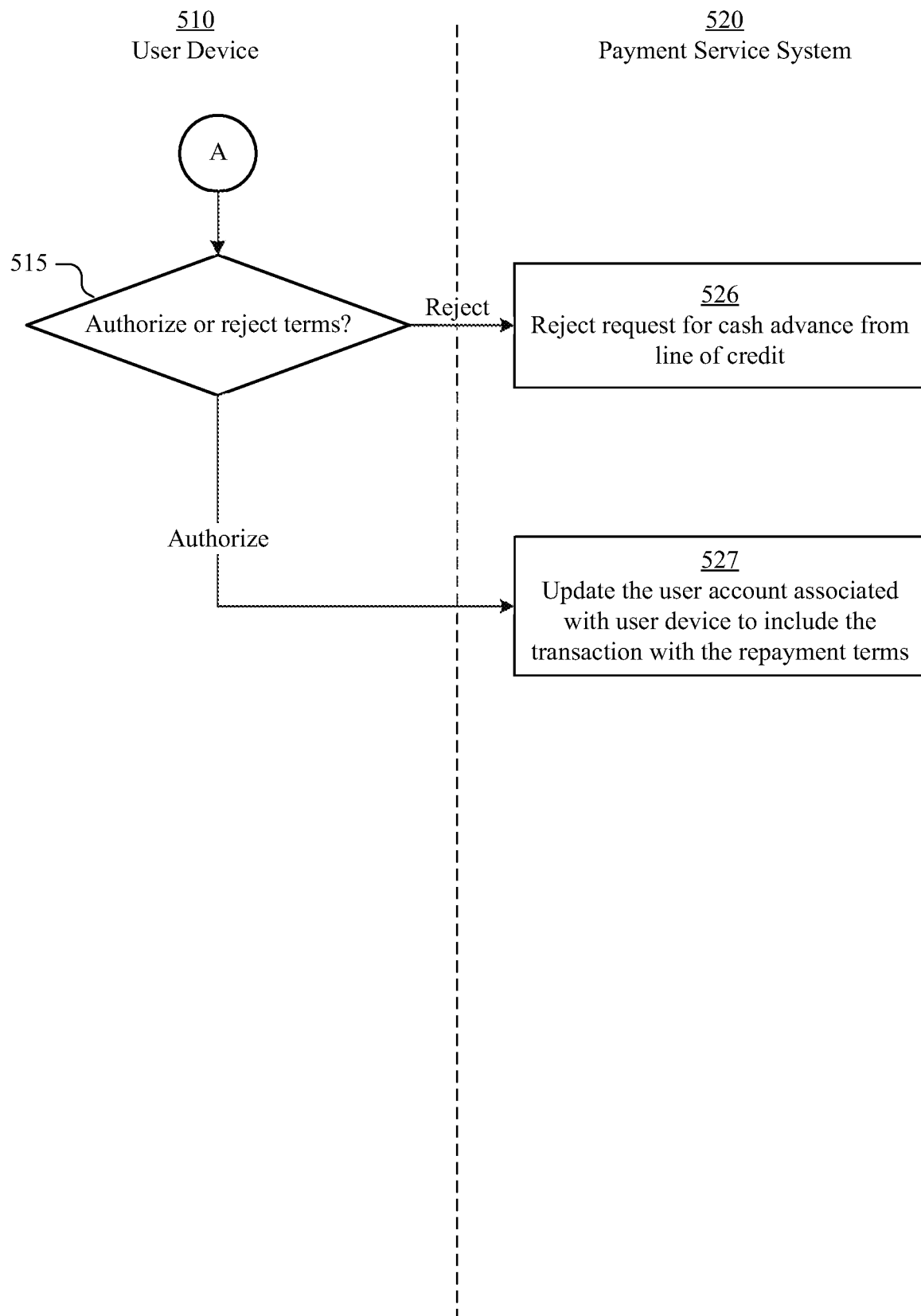

FIGS. 5A-5B illustrate the interactions between various actors, including the payment service system 520 and a user device 510, in a process for generating repayment terms for accessing a line of credit. In reviewing FIG. 5A, the process generally advances as the blocks representing steps of the process proceed from the top of the figure downward so that, even if an arrow does not connect blocks, a first block (e.g., the block for step 511) above a second block (e.g., the block for step 522) will generally occur first in the process. The process may begin at step 511, in which a user device 510 may receive a request for a cash advance from a line of credit associated with the user account. Then, at step 512, the user device 510 may send a request to for the cash advance to the payment service system 520. At step 521, the payment service system 520 may identify a transaction history of the user account and transaction characteristics of the transaction. After the payment service system 520 identifies the transaction history and transaction characteristics, the payment service system 520, in step 522, may determine whether the transaction is eligible for modified repayment terms based on the transaction history and the transaction characteristics. In step 523, if the transaction is not eligible then the process may proceed to step 513, where the user device 510 presents default repayment terms for user authorization. In step 513, if the transaction is eligible, the process proceeds to step 524, where the payment service system 520 may use a machine learning model applied to the identified information to generate repayment terms associated with the request. For example, the payment service system 520 may determine an interest rate associated with the transaction based on the transaction history and the transaction characteristics. At step 525, the payments service system 520 may transmit the repayment terms to the user device 510 for authorization of repayment terms. After the user device 510 receives the repayment terms, at step 514, the user device 510 presents the repayment terms for user authorization. At step 515 of FIG. 5B, a determination of whether the user device 510 receives authorization or a rejection may be made. If the user rejects the repayment terms, the process proceeds to step 526, where the user device 510 sends over the user rejection to the payment service system 520 and the payment service system 520 may reject the request for a cash advance from the line of credit. If the user authorizes the repayment terms by approving the repayment terms, the process proceeds to step 527, where the user device 510 sends over the user authorization to the payment service system 520 and the payment service system 520 may update the user account associated with the user device 510 to include the transaction with the repayment terms. This may include establishing a repayment schedule with a determined fee associated with the transaction and an interest rate charged to any leftover amount if the user is delinquent on paying off the debt. The process further enables significant new interactions because the user device and the payment service system as described throughout.

Figure 6A:
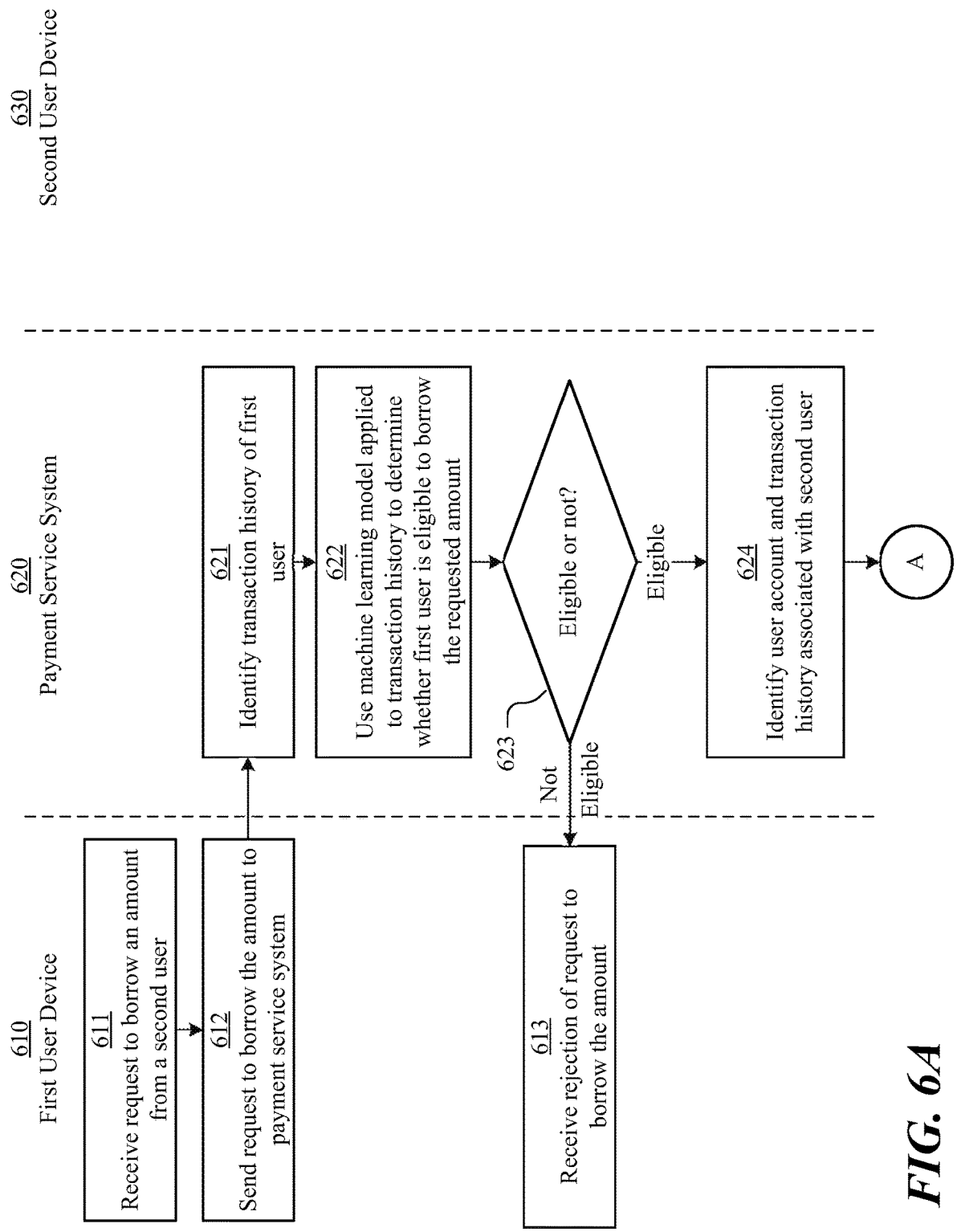
FIGS. 6A-6C illustrates a process for generating repayment terms for borrowing from another user in accordance with an example embodiment.
Figure 6B:
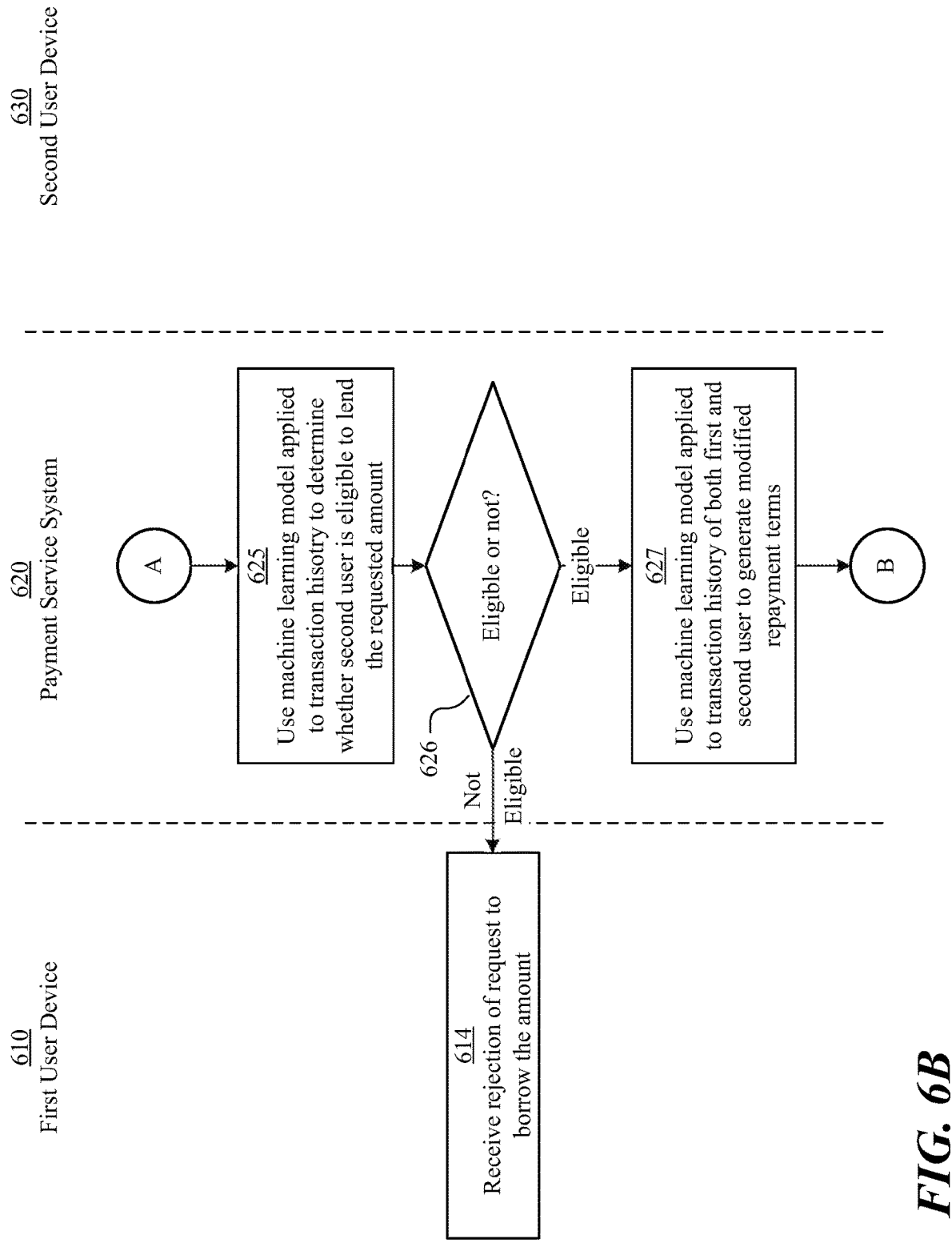
Figure 6C:
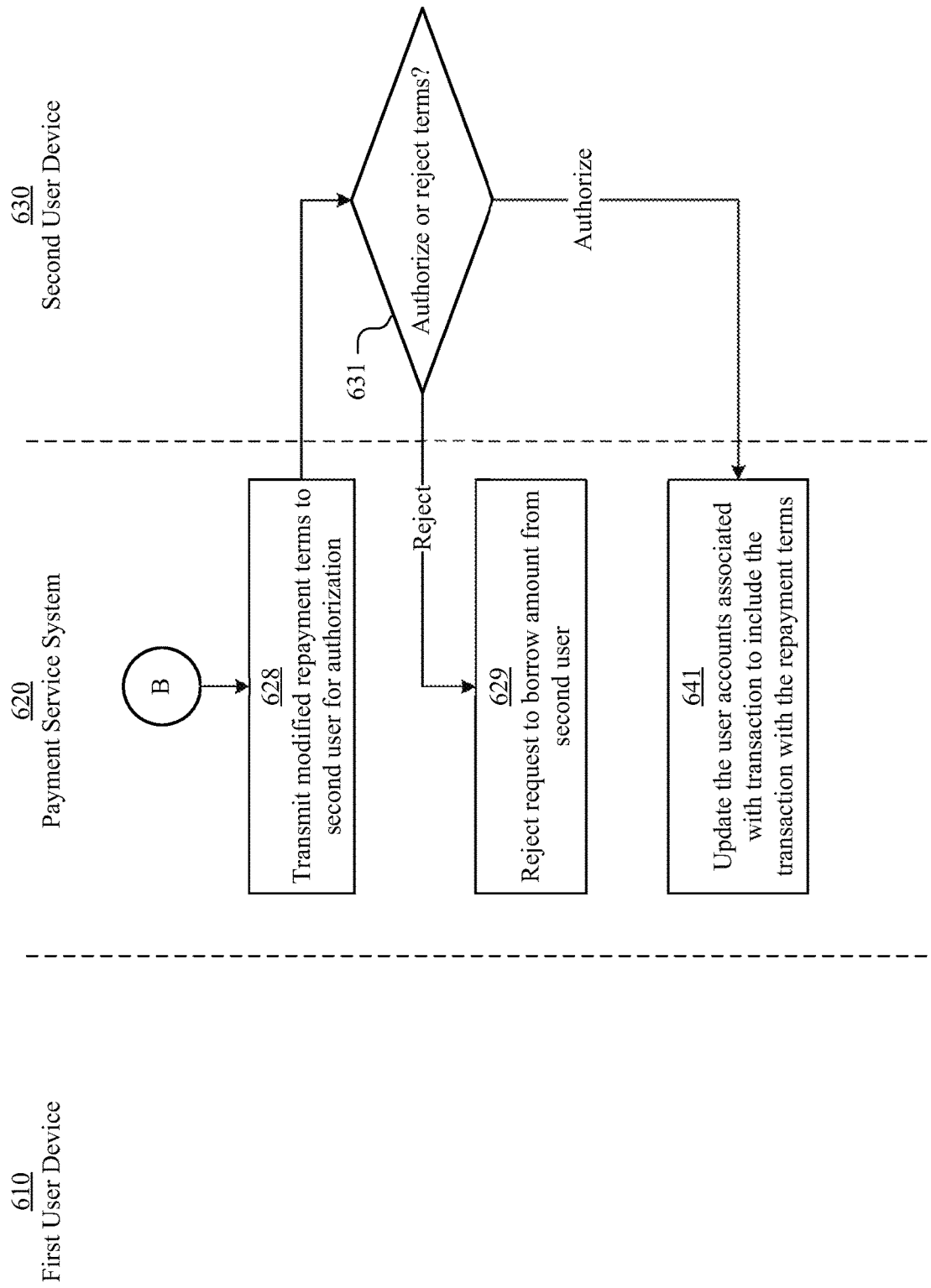

FIGS. 6A-6C illustrate the interactions between various actors, including the payment service system 620, a first user device 610, and a second user device 630 in a process for generating repayment terms for borrowing from another user. In reviewing FIG. 6A, the process generally advances as the blocks representing steps of the process proceed from the top of the figure downward so that, even if an arrow does not connect blocks, a first block (e.g., the block for step 611) above a second block (e.g., the block for step 622) will generally occur first in the process. The process may begin at step 511, in which a first user device 610 may receive a request for to borrow an amount from a second user. Then, at step 612, the first user device 610 may send a request to borrow the amount to the payment service system 620. At step 621, the payment service system 620 may identify a transaction history of the user account associated with the first user. After the payment service system 620 identifies the transaction history, the payment service system 620, in step 622, may use a machine learning model applied to the transaction history to determine whether the first user is eligible to borrow the requested amount. In step 623, if the first user is not eligible, then the process proceeds to step 613, where the first user device 610 receives a rejection of request to borrow the amount. In step 623, if the first user is eligible, then the process may continue to step 624, where the payment service system 620 may identify a user account and transaction history associated with the second user. At step 625 of FIG. 6B, the payment service system may use a machine learning model applied to the transaction history of the second user to determine whether the second use is eligible to lend the requested amount. In step 626, if the second user is not eligible, then the process proceeds to step 614, where the first user device 610 receives a rejection of request to borrow the amount. In step 626, if the second user is eligible, then the process proceeds to step 627, where the payment service system 620 uses a machine learning model applied to the transaction histories of both the first user and the second user to generate modified repayment terms. At step 628 of FIG. 6C, the payment service system 620 may transmit the modified repayment terms to the second user for authorization. In step 631, a determination of whether the second user device 630 receives authorization or a rejection may be made. If the second user rejects the repayment terms, the process proceeds to step 629, where the second user device 630 sends over the user rejection to the payment service system 620 and the payment service system 620 may reject the request to borrow the amount from the second user. If the second user authorizes the repayment terms by approving the repayment terms, the process proceeds to step 641, where the second user device 630 sends over the user authorization to the payment service system 620 and the payment service system 620 may update the user accounts associated with the first user device 610 and the second user device 630 to include the transaction with the repayment terms. This may include establishing a repayment schedule with a determined fee associated with the transaction and an interest rate charged to any leftover amount if the first user is delinquent on paying off the debt. The process further enables significant new interactions because the first user device, second user device, and the payment service system as described throughout.

Figure 7A:
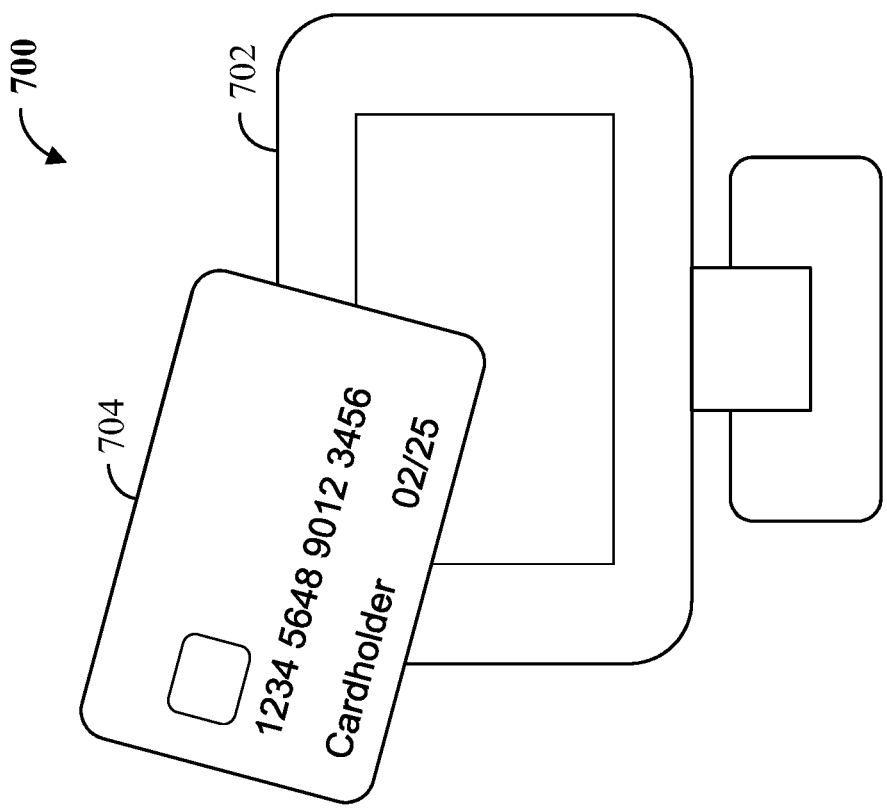
FIGS. 7A-7C illustrate example use interface associated with accessing a debt instrument according to one embodiment.
Figures 7B, 7C:
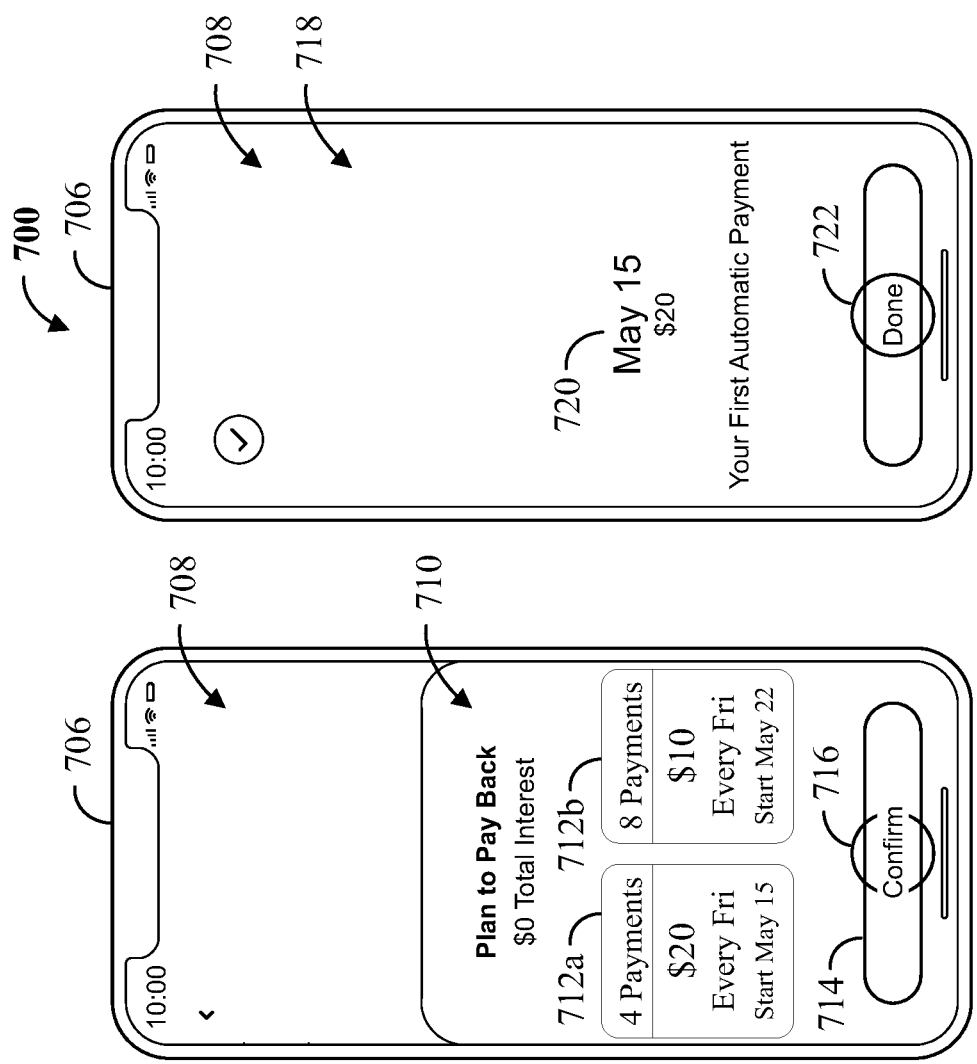

FIGS. 7A-7C illustrate example user interfaces for a process 700 and a process 700 of generating payment terms associated with using a payment card. Similar interfaces with minor modifications may also be used to allow a user to pay off debt using the example mobile application. In FIG. 7A, a user may use a payment card 704 at a POS device 702 of a merchant for a transaction. The POS device 702 may previously have the transaction details and wait for payment from the user. The mobile application 708 may provide functionalities for a user to access and manage debt instruments. The debt instruments may include credit cards, a line of credit, or loans. As illustrated by FIG. 7B, such functionalities may be provided in the user interface 710 of a mobile application 708 executing on a user device 706. The user interface 710 may represent a screen that appears in response to the user using the payment card 704 to pay for a transaction. The user interface 710 may be an overlay on top of another user interface that represents a home screen of the mobile application 708. In other embodiments, the user interface 710 may open a separate screen different from the home screen. The payment service system may determine a repayment plan that will prevent the user from being charged an interest rate for the transaction. In particular embodiments, the payment service system may determine multiple repayment schedules 712 that may work best for the user based on the transaction history, income, and cash flow of the user. The user interface 710 may comprise a suggested repayment schedule 712a among other repayment schedules 712, such as repayment schedule 712b, and a "Confirm" button 714 directing the user to an interface confirming a payment using the payment card. As shown in FIG. 7B, the user may select the "Confirm" button 714 through a user input 716. In particular embodiments, a first repayment schedule 712a may be selected and may be differentiated from other repayment schedules 712. As an example and not by way of limitation, the first repayment schedule 712a may be highlighted indicating the currently selected repayment schedule 712a. In particular embodiments, there may be a plurality of repayment schedules 712 that the user may scroll through to select the desired repayment schedule 712.

The user interface 718 shown in FIG. 7C illustrates the result of the user selecting the "Confirm" button 7B through the user input 716. In other embodiments, the application 708 may also display a confirmation page that comprises the details of the request to access the line of credit in a summary format after the user selects the "Confirm" button 714. The user interface 718 may comprise a confirmation date of the first payment 720 and a "Done" button 722 directing the user back to a home screen, which would show an updated transaction history including the recent transaction.

Figure 8C:
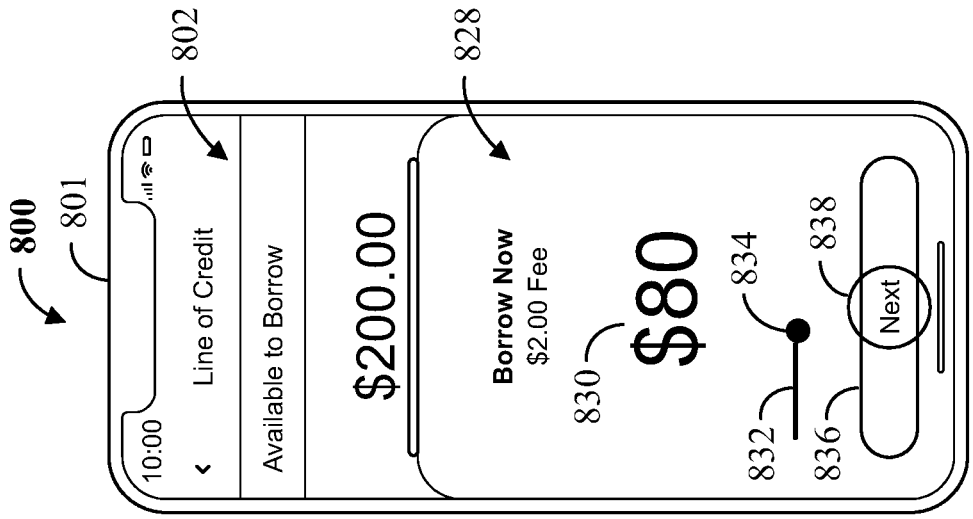
FIGS. 8A-8E illustrate example user interfaces associated with accessing a debt instrument according to one embodiment.
Figure 8B:
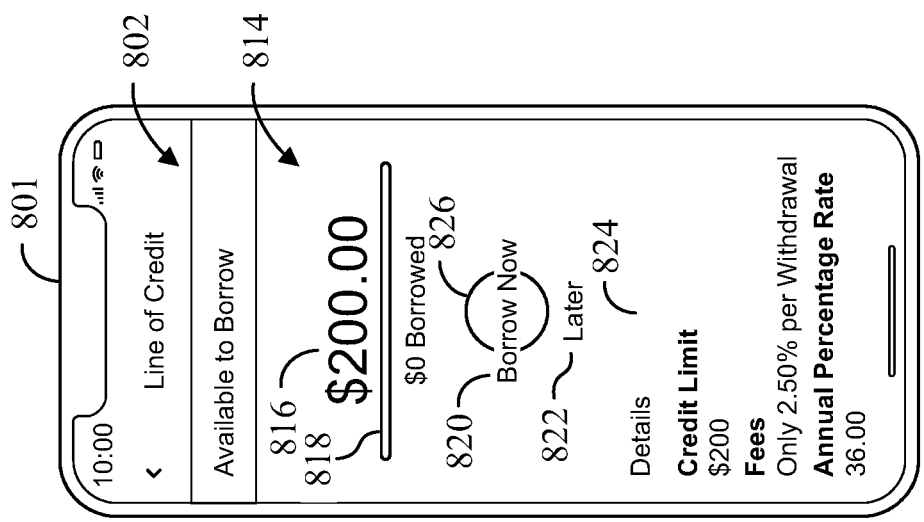
Figure 8A:
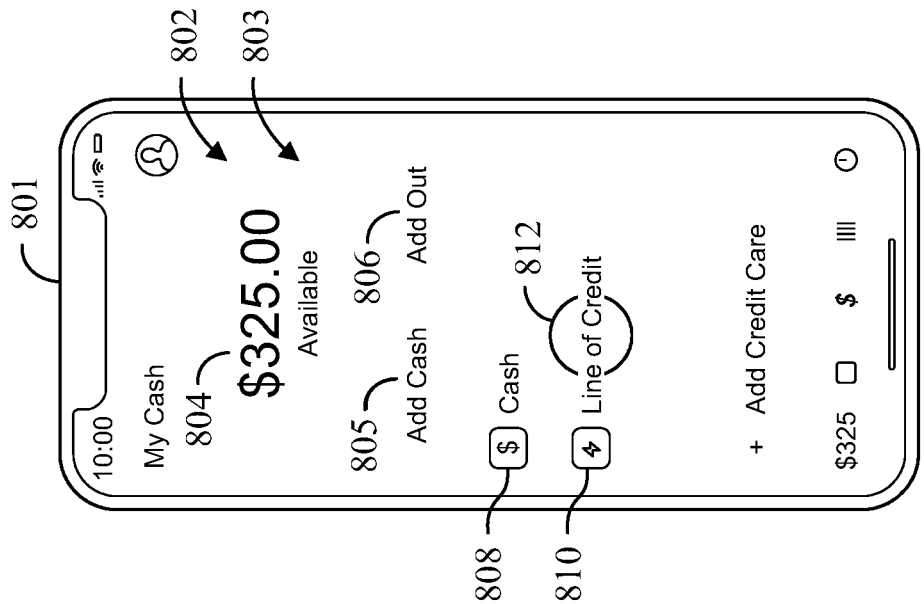

FIGS. 8A-8E illustrate example user interfaces for a process 800 of accessing a line of credit using an example mobile application 802 associated with a payment service system, the mobile application executing on a user device 801. Similar interfaces with minor modifications may also be used to allow a user to pay off debt using the example mobile application 802 (e.g., substituting graphics relating to accessing a line of credit with graphics relating to paying off debt associated with a line of credit). The mobile application 802 may provide functionalities for a user to access and manage debt instruments. The debt instruments may include credit cards, a line of credit, or loans. As illustrated by FIG. 8A, such functionalities may be provided in the user interface 803. The user interface 803 may represent a home screen of the mobile application 802. The user interface 803 may comprise a balance 804 (e.g., $325) associated with the user account displaying the amount of funds currently available, an "Add Cash" button 805 directing the user to an interface for adding additional funds to the balance 804, a "Cash Out" button 806 directing the user to an interface for withdrawing funds from the balance 804. The user interface 803 may comprise a "Cash" button 808 directing the user to an interface for managing one or more fiat currencies and one or more financial accounts and a "Line of Credit" button 810 directing the user to an interface for accessing a line of credit associated with the user account. As shown in FIG. 8A, the user may select the "Line of Credit" button 810 through a user input 812.

The user interface 814 shown in FIG. 8B illustrates the result of the user selecting the "Line of Credit" button 810 through the user input 812. The user interface 814 may comprise an available line of credit amount 816, an indication 818 of how much is borrowed from the line of credit, a "Borrow Now" button 820 directing the user to an interface for selecting a portion of the line of credit to access now, a "Later" button 822 directing the user to an interface for selecting a portion of the line of credit to access at a later date, and a details section 824 providing details associated with the line of credit of the user account. As shown in FIG. 8B, the user may select the "Borrow Now" button 820 through a user input 826.

The user interface 828 shown in FIG. 8C illustrates the result of the user selecting the "Borrow Now" button 820 through the user input 826. The user interface 828 may be an overlay on top of the user interface 814. In other embodiments, the user interface 828 may open a separate screen different from user interface 814. The user interface 828 may comprise an amount 830 indicative of portion of the line of credit the user wishes to borrow, a slider element 832 with a button 834 to indicate what portion of the line of credit the user wishes to borrow, and a "Next" button 836 directing the user to an interface for determining a repayment schedule for the transaction. In particular embodiments, the payment service system 108 may receive an indication of a transaction and automatically determine an amount 830 the user may wish to borrow. The indication may be received in response to a request to charge a payment card for a transaction or as a result of a transaction, which would bypass FIGS. 8A and 8B. As shown in FIG. 8C, the user may select the "Next" button 836 through a user input 838.

Figures 8D, 8E:
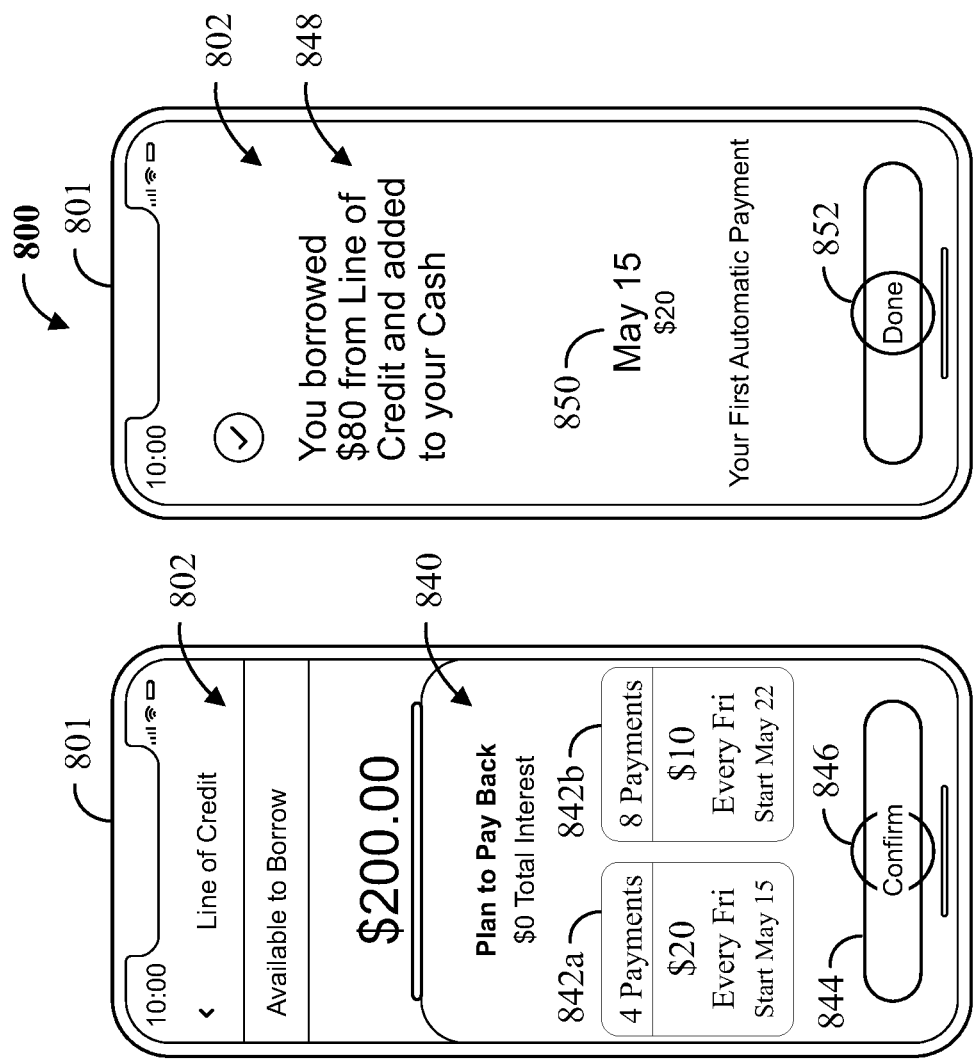

The user interface 840 shown in FIG. 8D illustrates the result of the user selecting the "Next" button 836 through the user input 838. The user interface 840 may be an overlay on top of the user interface 814. In other embodiments, the user interface 840 may open a separate screen different from user interface 814. The payment service system 108 may determine a repayment plan that will prevent the user from being charged an interest rate for the transaction. In particular embodiments, the payment service system 108 may determine multiple repayment schedules that may work best for the user based on the transaction history, income, and cash flow of the user. The user interface 840 may comprise a suggested repayment schedule 842a among other repayment schedules 842, such as repayment schedule 842b, and a "Confirm" button 844 directing the user to an interface confirming a request to transfer funds from the line of credit to the user's balance. As shown in FIG. 8D, the user may select the "Confirm" button 844 through a user input 846. In particular embodiments, a first repayment schedule 842a may be selected and may be differentiated from other repayment schedules 842. As an example and not by way of limitation, the first repayment schedule 842a may be highlighted indicating the currently selected repayment schedule 842a. In particular embodiments, there may be a plurality of repayment schedules 842 that the user may scroll through to select the desired repayment schedule 842.

The user interface 848 shown in FIG. 8E illustrates the result of the user selecting the "Confirm" button 844 through the user input 846. In other embodiments, the application 802 may also display a confirmation page that comprises the details of the request to access the line of credit in a summary format after the user selects the "Confirm" button 844. The user interface 848 may comprise a confirmation date of the first payment 850 and a "Done" button 852 directing the user back to user interface 803, which would show the updated balance 804 including the transfer from the line of credit to the balance 804.

Figures 9E, 9F:
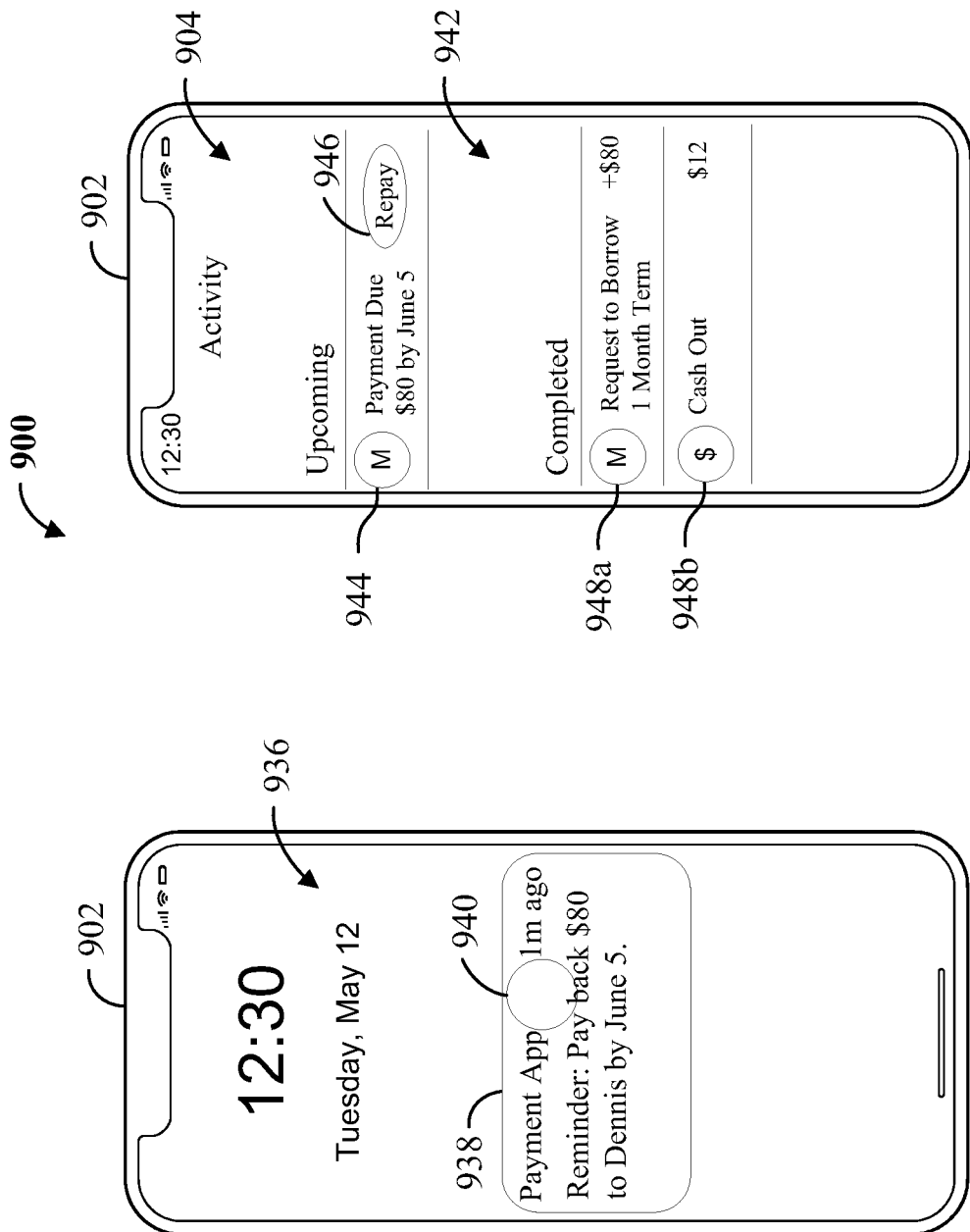

FIGS. 9A-9F illustrate example user interfaces for a process 900 of requesting to borrow funds from another user using an example mobile application 904 executing on a user device 902, the mobile application 904 being associated with a payment service system. Similar interfaces with minor modifications may also be used to allow a user to pay off debt using the example mobile application 904. The mobile application 904 may provide functionalities for a user to access and manage debt instruments. The debt instruments may include credit cards, a line of credit, or loans. As illustrated by FIG. 9A, such functionalities may be provided in the user interface 905. The user interface 905 may represent a home screen of the mobile application 904. In particular embodiments, the user interface 905 may represent a user interface after selecting an option to borrow from friends from a home screen of the mobile application 904. In particular embodiments, the payment service system may identify suggested users that the user may wish to request to borrow from. As an example and not by way of limitation, the payment service system may determine suggested users based on interactions between the user and other users. For instance, if the user has sent and requested money from a particular user frequently, then that particular user may be added to a suggested user list. The user interface 905 may comprise a list of users that the user is friends with or have previously transacted with. The list of users comprises one of more buttons 906a-906d that correspond to a particular user account of the payment service system. Each of the buttons 906 may direct the user to an interface for requesting to borrow an amount from the respective user. As shown in FIG. 9A, the user may select the "Dennis Mills" button 906b through a user input 908.

The user interface 910 shown in FIG. 9B illustrates the result of the user selecting the "Dennis Mills" button 906b through the user input 908. The user interface 910 may comprise may be an overlay on top of the user interface 905. In other embodiments, the user interface 910 may open a separate screen different from user interface 905. The user interface 910 may comprise an amount 912 indicative of portion of the amount the user wishes to borrow, a slider element 914 with a button 916 to indicate what amount the user wishes to borrow, and a "Next" button 918 directing the user to an interface for determining a repayment schedule for the transaction. In particular embodiments, the payment service system may receive an indication of a transaction and automatically determine an amount 912 the user may wish to borrow. The indication may be received in response to a request to charge a payment card for a transaction or as a result of a transaction, which would bypass FIG. 9A. In particular embodiments, the amount the user wishes to borrow may be included in the user interface 905 shown in FIG. 9A. As an example and not by way of limitation, the user can input the amount on the user interface 905 prior to selecting a user to borrow from. As shown in FIG. 9B, the user may select the "Next" button 918 through a user input 920.

The user interface 922 shown in FIG. 9C illustrates the result of the user selecting the "Next" button 918 through the user input 920. The user interface 922 may be an overlay on top of the user interface 905. In other embodiments, the user interface 922 may open a separate screen different from user interface 905. The payment service system may determine a repayment plan that will prevent the user from being charged an interest rate for the transaction. In particular embodiments, the payment service system may determine multiple repayment schedules that may work best for the user based on the transaction history, income, and cash flow of the user. The user interface 922 may comprise a suggested repayment schedule 924*a* among other repayment schedules 924, such as repayment schedule 924*b*, and a "Confirm" button 926 directing the user to an interface confirming a request to transfer funds from the line of credit to the user's balance. As shown in FIG. 9C, the user may select the "Confirm" button 926 through a user input 928. In particular embodiments, a first repayment schedule 924*a* may be selected and may be differentiated from other repayment schedules 924. As an example and not by way of limitation, the first repayment schedule 924*a* may be highlighted indicating the currently selected repayment schedule 924*a*. In particular embodiments, there may be a plurality of repayment schedules 924 that the user may scroll through to select the desired repayment schedule 924.

The user interface 930 shown in FIG. 9D illustrates the result of the user selecting the "Confirm" button 926 through the user input 928. In other embodiments, the application 904 may also display a confirmation page that comprises the details of the request to access the line of credit in a summary format after the user selects the "Confirm" button 926. The user interface 930 may comprise a confirmation date of the first payment 932 and a "Done" button 934 directing the user back to user interface associated with the home screen, which would show the updated balance of the user account including the transfer from the borrowed amount to the user balance.

The user interface 936 shown in FIG. 9E illustrates an example reminder the user may receive at a later date to repay the borrowed money from the lender. In particular embodiments, the user may set up reminders while requesting to borrow the money from the lender. The user may select a frequency and/or when to receive a reminder in the future to pay back the borrowed amount. As an example and not by way of limitation, the user may select to be reminded three days before a scheduled repayment date and be reminded every day until the user pays the amount due for the scheduled repayment date. So if the user has a scheduled repayment date on Friday, the user may be reminded on Tuesday to pay off the amount due for that week. The user interface 936 may comprise the reminder 938. The user interface 936 may be a home screen of a user device 902. In other embodiments, the reminder 938 may be displayed as a notification in other user interfaces of the user device. As an example and not by way of limitation, the reminder 938 may be a pop-up notification while the user is interfacing the user device 902. As shown in FIG. 9E, the user may select the reminder 938 through a user input 940.

The user interface shown in FIG. 9F illustrates the result of the user selecting the reminder 938 through the user input 940. In particular embodiments, the selection of the reminder 938 may open the mobile application 904 to a user interface 942. The user interface 942 may display the recent activity of the user within the mobile application 904, such as recent transactions, completed transactions, pending transactions, upcoming transactions, and the like. In particular embodiments, the user interface 942 may comprise upcoming transactions 944 and list them for the user. Based on one or more account records associated with the user stored in a database of the payment service system, the payment service system may determine if an action needs to be completed with respect to the upcoming transaction 944 and may provide instructions to the user device 902 to generate an interactive button 946 on the mobile application 904 to complete the action. As an example and not by way of limitation, the upcoming transaction 944 may be a repayment due and a "Repay" button 946 may be linked to the upcoming transaction 944 to allow the user to access a user interface to repay the transaction. The "Repay" button 946 may direct the user to an interface to simply pay the next payment (e.g., amount due for the week) and/or modify to pay more of the borrowed amount. The user interface 942 may comprise interactive buttons for each completed transaction 948, such as completed transaction 948*a* directing the user to an interface detailing the transaction and completed transaction 948*b* directing the user to an interface detailing the transaction.

FIGS. 10A-10C illustrate example user interfaces for a process 1000 of approving a request to borrow funds from another user using an example mobile application 1004 executing on a user device 1002, the mobile application 1004 being associated with a payment service system. Similar interfaces with minor modifications may also be used to allow a user to pay off debt using the example mobile application 1004. The mobile application 1004 may provide functionalities for a user to access and manage debt instruments. The debt instruments may include credit cards, a line of credit, or loans. As illustrated by FIG. 10A, such functionalities may be provided in the user interface 1006. The user interface 1006 may represent an activities screen of the mobile application 1004. The user interface 1006 may display recent activity of the user within the mobile application 1004, such as recent transactions, completed transactions, pending transactions, upcoming transactions, and the like. The user interface 1006 may comprise pending transactions 1008 and list them for the user. The payment service system may determine if an action needs to be completed with respect to the pending transaction 1008 and may provide instructions to the user device 1002 to generate an interactive button 1010 on the mobile application 1004 to complete the action. The payment service system may use one or more account records associated with the user stored in a database of the payment service system to make the determination if an action needs to be completed. As an example and not by way of limitation, the pending transaction 1008 may be a request to borrow money from another user and a "Lend" button 1010 may be linked to the pending transaction 1008 to allow the user to access a user interface to approve the transaction. The "Lend" button 1010 may direct the user to an interface to approve a request to borrow money and/or modify one or more repayment terms for the request to borrow money. As an example and not by way of limitation, if a user wishes to borrow money from the user associated with the user device 1002, then the user would receive the request under the user's pending transactions 1008 with details of the request. The user interface 1006 may comprise interactive buttons for each completed transaction 1012, such as completed transaction 1012*a* directing the user to an interface detailing the transaction and completed transaction 1012*b* directing the user to an interface detailing the transaction. As shown in FIG. 10A, the user may select the "Lend" button 1010 through a user input 1014. In accordance with one embodiment, upon the lending user approving the request to borrow funds (i.e., by selecting the "Lend" button 1010), the payment service stores a record of the transaction as between financial accounts of the requesting user and the lending user. Additionally, the payment service may generate reminder notifications associated with terms (e.g., due date, payment amount) of the request to borrow, and facilitate transaction processing of repayment amounts between the financial accounts of the two parties based on the repayment terms (e.g., withholding a percentage of future incoming payments for loan repayment, automated installment amounts processed on due date, user interacting with "Repay" button of FIG. 9F, etc.).

The user interface 1006 shown in FIG. 10B, illustrates the result of the user selecting the "Lend" button 1010 through a user input 1014. The user interface 1006 may refresh to update the activities screen to change the pending transaction 1008 to a completed transaction 1012. The completed transactions 1012 may be reordered to have the latest completed transaction 1012 listed first. As shown in FIG. 10B, the user may select the completed transaction 1012*a* through a user input 1016.

The user interface 1018 shown in FIG. 10C, illustrates the result of the user selecting the completed transaction 1012*a* through user input 1016. The user interface 1018 may comprise details of the completed transaction 1012*a* and an overlay 1020 that includes the details of the completed transaction 1012*a*. The overlay 1020 may also comprise a "Forgive" button 1022 directing the user to an interface to forgive the remainder of the balance on the loan and a "Support" button 1024 directing the user to an interface to contact support of the mobile application 1004. In particular embodiments, the "Forgive" button 1022 may remove the loan from the borrower's upcoming transactions and mark the transaction as completed and forgiven.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices associated with a payment service system (PSS):
receiving, by the PSS from a first instance of a payment service application associated with the payment service system executing on a first electronic device associated with a first user, a request to borrow an amount from a second user, wherein the first user is associated with a first user account maintained by the PSS and the second user is associated with a second user account maintained by the PSS;
in response to receiving the request from the payment service application, identifying, by the PSS, a first transaction history associated with the first user account and a second transaction history associated with the second user account in a data store of the PSS;
determining, by the PSS and using one or more trained machine learning classifiers, repayment terms to be associated with the request to borrow the amount, the one or more trained machine learning classifiers having been trained based on evaluations of the first transaction history and the second transaction history;
identifying, by the PSS, a time to send the request to borrow the amount to the second user based on the second transaction history associated with the second user account using the one or more trained machine learning classifiers;
transmitting, by the PSS, an indication of the request to borrow the amount to a second instance of the payment service application executing on a second electronic device associated with the second user at the identified time; and
upon receiving an indication of authorization from the second user through the second instance of the payment service application executing on the second electronic device, updating, by the PSS, the first user account to include the requested amount to be borrowed with the repayment terms.

2. The method of claim 1, further comprising:
identifying, by the PSS, context characteristics associated with the request; and
wherein determining the repayment terms further comprises evaluating the identified context characteristics using the one or more trained machine learning classifiers, and wherein the one or more identified context characteristics comprise one or more of a date associated with the request, a time associated with the request, and a balance associated with the first user account or second user account.

3. The method of claim 1, wherein determining the repayment terms further comprises evaluating one or more of an incoming payroll, a deposits activity, cash flow associated with equities or securities, or peer-to-peer transactions associated with the first user account or the second user account using the one or more trained machine learning classifiers.

4. The method of claim 1, further comprising:
identifying, by the PSS, a list of second users from whom the first user can request to borrow the amount based on the transaction history of the first user including each of the second users; and
sending, by the PSS, to the first instance of the payment service application executing on the first electronic device, instructions to present the list of second users to the first user, wherein receiving the request to borrow the amount from the second user comprises the first user selecting the second user from the list of second users.

5. A method comprising, by one or more computing devices associated with a payment service system (PSS):
receiving, by the PSS and from a first instance of a payment service application associated with the payment service system executing on a first electronic device of a first user, a request to borrow an amount from a second user, wherein the first user is associated with a first user account maintained by the PSS and the second user is associated with a second user account maintained by the PSS;
in response to receiving the request from the payment service application, identifying, by the PSS, a first historical context information associated with the first user account and a second historical context information associated with the second user account;
determining, by the PSS and using one or more trained machine learning classifiers, repayment terms to be associated with the request to borrow the amount, the one or more trained machine learning classifiers having been trained based on evaluations of the first historical context information and the second historical context information;
transmitting, by the PSS, an indication of the request to borrow the amount to a second instance of the payment service application executing on a second electronic device associated with the second user at an identified time; and
upon receiving an indication of authorization from the second user through the second instance of the payment service application executing on the second electronic device, updating, by the PSS, the first user account to include the requested amount to be borrowed with the repayment terms.

6. The method of claim 5, wherein the first user account is a revolving account that includes dynamic repayment terms for each request.

7. The method of claim 5, further comprising:
identifying, by the PSS, context characteristics associated with the request;
wherein determining the repayment terms further comprises evaluating the identified context characteristics using the one or more trained machine learning classifiers, and wherein the one or more identified context characteristics comprise one or more of a date associated with the request, a time associated with the request, and a balance associated with the first user account or second user account.

8. The method of claim 5, wherein determining the repayment terms further comprises evaluating one or more of an incoming payroll, a deposits activity, cash flow associated with equities or securities, or peer-to-peer transactions associated with the first user account or the second user account using the one or more trained machine learning classifiers.

9. The method of claim 5, further comprising:
identifying, by the PSS, a list of second users from whom the first user can request to borrow the amount based on the transaction history of the first user including each of the second users; and
sending, by the PSS, to the first instance of the payment service application executing on the first electronic device, instructions to present the list of second users to the first user, wherein receiving the request to borrow the amount from the second user comprises the first user selecting the second user from the list of second users.

10. The method of claim 5, further comprising:
facilitating, by the PSS, repayment of the requested amount by automatically debiting a repayment amount from the first user account based on a determined repayment schedule from the repayment terms.

11. The method of claim 5, further comprising:
detecting, by the PSS, an amount of an incoming credit to the first user account;
determining, by the PSS, a percentage of the amount of the incoming credit to be used as a repayment amount for the borrowed amount; and
initiating, by the PSS, a transfer of the repayment amount from the first user account to the second user account.

12. The method of claim 5, further comprising:
generating, by the PSS, a reminder for the first user to repay the requested amount based on the repayment terms; and
transmitting, by the PSS, the reminder to the first instance of the payment service application executing on the first electronic device of the first user.

13. A payment service system comprising:
one or more processors; and
one or more computer-readable non-transitory storage media coupled to one or more of the processors and comprising instructions operable when executed by one or more of the processors to cause the payment service system (PSS) to perform operations comprising:
receiving, by the PSS and from a first instance of a payment service application associated with the payment service system executing on a first electronic device of a first user, a request to borrow an amount from a second user, wherein the first user is associated with a first user account maintained by the PSS and the second user is associated with a second user account maintained by the PSS;
in response to receiving the request from the payment service application, identifying, by the PSS, a first historical context information associated with the first user account and a second historical context information associated with the second user account;
determining, by the PSS and using one or more trained machine learning classifiers, repayment terms to be associated with the request to borrow the amount, the one or more trained machine learning classifiers having been trained based on evaluations of the first historical context information and the second historical context information;
transmitting, by the PSS, an indication of the request to borrow the amount to a second instance of the payment service application executing on a second electronic device associated with the second user at an identified time; and upon receiving an indication of authorization from the second user through the second instance of the payment service application executing on the second electronic device, updating, by the PSS, the first user account to include the requested amount to be borrowed with the repayment terms.

14. The payment service system of claim 13, wherein the first user account is a revolving account that includes dynamic repayment terms for each request.

15. The payment service system of claim 13, wherein the one or more processors are further operable when executed to cause the PSS to perform further operations comprising:
   identifying, by the PSS, context characteristics associated with the request;
   wherein determining the repayment terms further comprises evaluating the identified context characteristics using the one or more trained machine learning classifiers, and wherein the one or more identified context characteristics comprise one or more of a date associated with the request, a time associated with the request, and a balance associated with the first user account or second user account.

16. The payment service system of claim 13, wherein determining the repayment terms further comprises evaluating one or more of an incoming payroll, a deposits activity, cash flow associated with equities or securities, or peer-to-peer transactions associated with the first user account or the second user account using the one or more trained machine learning classifiers.

17. The payment service system of claim 13, wherein the one or more processors are further operable when executed to cause the PSS to perform further operations comprising:
   identifying, by the PSS, a list of second users from whom the first user can request to borrow the amount based on the transaction history of the first user including each of the second users; and
   sending, by the PSS, to the first instance of the payment service application executing on the first electronic device, instructions to present the list of second users to the first user, wherein receiving the request to borrow the amount from the second user comprises the first user selecting the second user from the list of second users.

18. The payment service system of claim 13, wherein the one or more processors are further operable when executed to cause the PSS to perform further operations comprising:
   facilitating, by the PSS, repayment of the requested amount by automatically debiting a repayment amount from the first user account based on a determined repayment schedule from the repayment terms.

19. The payment service system of claim 13, wherein the one or more processors are further operable when executed to cause the PSS to perform further operations comprising:
   detecting, by the PSS, an amount of an incoming credit to the first user account;
   determining, by the PSS, a percentage of the amount of the incoming credit to be used as a repayment amount for the borrowed amount; and
   initiating, by the PSS, a transfer of the repayment amount from the first user account to the second user account.

20. The payment service system of claim 13, wherein the one or more processors are further operable when executed to cause the PSS to perform further operations comprising:
   generating, by the PSS, a reminder for the first user to repay the requested amount based on the repayment terms; and
   transmitting, by the PSS, the reminder to the first instance of the payment service application executing on the first electronic device of the first user.

* * * * *